(12) United States Patent
Okado et al.

(10) Patent No.: US 10,593,922 B2
(45) Date of Patent: Mar. 17, 2020

(54) BATTERY PACK

(71) Applicant: SANYO Electric Co., Ltd., Daito-shi, Osaka (JP)

(72) Inventors: Tetsuya Okado, Hyogo (JP); Keisuke Minami, Hyogo (JP); Masashi Muraoka, Hyogo (JP); Tomoharu Arai, Hyogo (JP); Toyoki Fujihara, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 257 days.

(21) Appl. No.: 15/850,058

(22) Filed: Dec. 21, 2017

(65) Prior Publication Data

US 2018/0269449 A1 Sep. 20, 2018

(30) Foreign Application Priority Data

Mar. 17, 2017 (JP) .................................. 2017-052757

(51) Int. Cl.
*H01M 2/14* (2006.01)
*H01M 10/0587* (2010.01)
(Continued)

(52) U.S. Cl.
CPC ........... *H01M 2/14* (2013.01); *H01M 2/0217* (2013.01); *H01M 2/1077* (2013.01);
(Continued)

(58) Field of Classification Search
CPC .... H01M 2/14; H01M 2/0217; H01M 2/1077; H01M 2/1094; H01M 10/0587; H01M 2220/20
See application file for complete search history.

(56) References Cited

U.S. PATENT DOCUMENTS

| 8,124,262 B2 * | 2/2012 | Okada ................. H01M 10/613 |
| | | 429/120 |
| 2006/0246348 A1 * | 11/2006 | Hamada .............. H01M 2/1072 |
| | | 429/148 |

(Continued)

FOREIGN PATENT DOCUMENTS

| JP | 2010-287530 A | 12/2010 |
| JP | 4630855 B2 | 2/2011 |
| JP | 2015-210971 A | 11/2015 |

*Primary Examiner* — Gregg Cantelmo
(74) *Attorney, Agent, or Firm* — Westerman, Hattori, Daniels & Adrian, LLP

(57) ABSTRACT

A battery pack includes a plurality of prismatic secondary batteries with spacers each interposed therebetween. The prismatic secondary batteries each include a flat wound electrode body that is formed by winding a positive electrode plate and a negative electrode plate with a separator interposed therebetween; a prismatic outer body that houses the wound electrode body; and a sealing plate that seals an opening of the flat wound electrode body. The wound electrode body has a wound positive electrode core-exposed portion at one end portion and a wound negative electrode core-exposed portion at the other end portion. A positive electrode current collector is joined to the positive electrode core-exposed portion to form a positive electrode-joined portion, and a negative electrode current collector is joined to the negative electrode core-exposed portion to form a negative electrode-joined portion.

6 Claims, 11 Drawing Sheets

(51) Int. Cl.
*H01M 2/10* (2006.01)
*H01M 2/02* (2006.01)

(52) U.S. Cl.
CPC ...... *H01M 10/0587* (2013.01); *H01M 2/1094* (2013.01); *H01M 2220/20* (2013.01)

(56) References Cited

U.S. PATENT DOCUMENTS

| | | | | |
|---|---|---|---|---|
| 2008/0280194 | A1* | 11/2008 | Okada | H01M 2/1077 429/99 |
| 2009/0202900 | A1 | 8/2009 | Kuroda et al. | |
| 2012/0315508 | A1* | 12/2012 | Kurita | H01M 2/1077 429/7 |
| 2016/0218339 | A1* | 7/2016 | Nishimori | H01M 2/1077 |

* cited by examiner

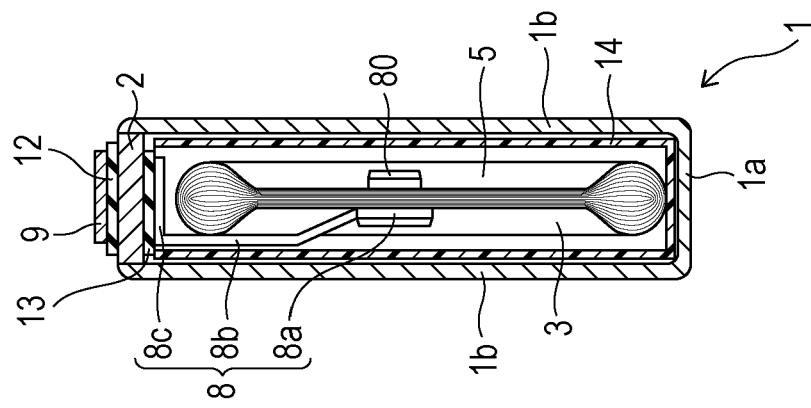
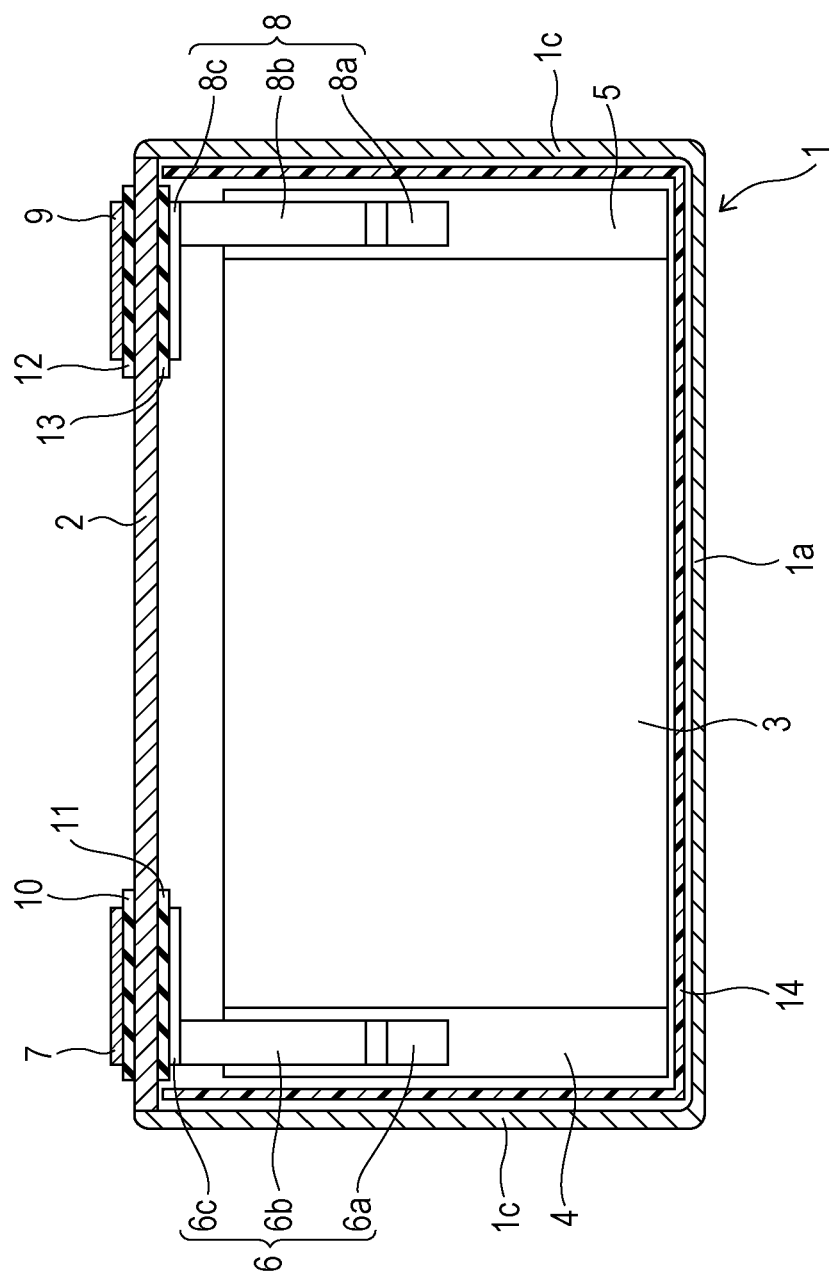

BATTERY PACK

CROSS REFERENCE TO RELATED APPLICATIONS

The present invention application claims priority to Japanese Patent Application No. 2017-052757 filed in the Japan Patent Office on Mar. 17, 2017, the entire contents of which are incorporated herein by reference.

BACKGROUND OF THE INVENTION

Field of the Invention

The present invention relates to a battery pack including plural prismatic secondary batteries.

Description of Related Art

Battery packs including plural prismatic secondary batteries connected in series or parallel are used as driving power sources in, for example, electric vehicles (EVs) and hybrid electric vehicles (HEVs, PHEVs).

In such a battery pack, plural prismatic secondary batteries are arranged such that the wide side surfaces of adjacent prismatic secondary batteries oppose each other with spacers or the like each interposed therebetween. For example, plural prismatic secondary batteries are placed between a pair of end plates, and the pair of end plates are connected to each other with binding bars to form a battery pack (Japanese Published Unexamined Patent Application No. 2015-210971 (Patent Document 1)).

For a typical prismatic secondary battery, a flat wound electrode body formed by winding a positive electrode plate and a negative electrode plate with a separator interposed therebetween is placed in a prismatic battery case. Charging and discharging such a prismatic secondary battery causes the wound electrode body to expand. The wound electrode body expands to a larger degree as the charge/discharge cycle proceeds. Such expansion of the wound electrode body appears remarkably in prismatic secondary batteries having high volume energy density. Expansion of the wound electrode body causes the wound electrode body to press the battery case outward, which results in expansion of the prismatic secondary battery.

When the force (reaction force) applied to press other components increases excessively due to expansion of the prismatic secondary battery, components of the battery pack, such as binding bars and end plates, may be damaged or fractured. In addition, expansion of the prismatic secondary battery may degrade performance of the prismatic secondary battery.

BRIEF SUMMARY OF THE INVENTION

An object of the present invention is to avoid damage or fracture of a battery pack which may be caused by expansion of prismatic secondary batteries.

A battery pack in an aspect of the present invention is a battery pack including plural prismatic secondary batteries with spacers each interposed therebetween. The prismatic secondary batteries each have a flat wound electrode body that is formed by winding a long positive electrode plate having a positive electrode active material mixture layer and a long negative electrode plate having a negative electrode active material mixture layer with a long separator interposed therebetween; a prismatic outer body that has an opening, a bottom, a pair of first side walls, and a pair of second side walls and houses the wound electrode body; and a sealing plate that seals the opening. The first side walls are larger in area than the second side walls. The wound electrode body has a wound positive electrode core-exposed portion on one of the pair of second side walls and a wound negative electrode core-exposed portion on the other of the pair of second side walls. A positive electrode current collector is joined to the positive electrode core-exposed portion to form a positive electrode-joined portion. A negative electrode current collector is joined to the negative electrode core-exposed portion to form a negative electrode-joined portion. The wound electrode body has a power generation part in which the positive electrode active material mixture layer and the negative electrode active material mixture layer are layered with the separator interposed therebetween. The power generation part has a flat portion having a flat outer surface, a first curved portion having a curved outer surface and located nearer to the sealing plate than the flat portion, and a second curved portion having a curved outer surface and located nearer to the bottom than the flat portion. The boundary between the flat portion and the first curved portion is defined as a first boundary, and the boundary between the flat portion and the second curved portion is defined as a second boundary. In the direction perpendicular to the bottom, the distance between the first boundary and a sealing plate-side end of the positive electrode-joined portion is denoted by L1. In the direction perpendicular to the bottom, a region of the power generation part, the region extending toward the first boundary from a position 0.25×L1 to a position 0.75×L1 distant from the sealing plate-side end of the positive electrode-joined portion, is defined as a first region. In the direction perpendicular to the bottom, the distance between the first boundary and a sealing plate-side end of the negative electrode-joined portion is denoted by L2. In the direction perpendicular to the bottom, a region of the power generation part, the region extending toward the first boundary from a position 0.25×L2 to a position 0.75×L2 distant from a sealing plate-side end of the negative electrode-joined portion, is defined as a second region. In the direction perpendicular to the bottom, the distance between the second boundary and a bottom-side end of the positive electrode-joined portion is denoted by L3. In the direction perpendicular to the bottom, a region of the power generation part, the region extending toward the second boundary from a position 0.25×L3 to a position 0.75×L3 distant from the bottom-side end of the positive electrode-joined portion, is defined as a third region. In the direction perpendicular to the bottom, the distance between the second boundary and a bottom-side end of the negative electrode-joined portion is denoted by L4. In the direction perpendicular to the bottom, a region of the power generation part, the region extending toward the second boundary from a position 0.25×L4 to a position 0.75×L4 distant from the bottom-side end of the negative electrode-joined portion, is defined as a forth region. When viewed in the direction perpendicular to one of the pair of first side walls, the area of a region pressed by each spacer, the region being in a region that lies in the one of the pair of first side walls and overlaps at least one of the first region and the second region, is 20% or less of the area of the region that lies in the one of the pair of first side walls and overlaps at least one of the first region and the second region. When viewed in the direction perpendicular to one of the pair of first side walls, the area of a region pressed by each spacer, the region being in a region that lies in the one of the pair of first side walls and overlaps at least one of the third region and the fourth region, is 20% or less of the area of the region that lies in the one of the pair of first side walls and overlaps at least one of the third region and the fourth region.

The inventors of the present invention have found that, in a prismatic secondary battery having a flat wound electrode body, charging and discharging or other factors tend to cause expansion of particular regions of the flat wound electrode body, the region being defined on the basis of the joined portion between the positive electrode core-exposed portion and the positive electrode current collector and the joined portion between the negative electrode core-exposed portion and the negative electrode current collector. This finding suggests that the reaction force is reduced by preventing particular regions of the flat wound electrode body from being pressed, and the frame components, such as end plates and binder bars, of the battery pack do not experience an excessive load accordingly. Here, the particular regions are defined on the basis of the joined portion between the positive electrode core-exposed portion and the positive electrode current collector and the joined portion between the negative electrode core-exposed portion and the negative electrode current collector.

The battery pack in one aspect can be configured such that portions of the flat wound electrode body that particularly easily expand due to charging and discharging or other factors are free of pressure from spacers. Therefore, even if the flat wound electrode body expands due to charging and discharging or other factors, an increase in reaction force can be suppressed, and the frame components, such as end plates and binder bars, of the battery pack do not experience an excessive load. This provides a highly reliable battery pack.

When a region free of pressure from a spacer is provided in at least one of a pair of wide side walls, namely, a pair of first side walls, of the prismatic secondary battery, an increase in reaction force in the region free of pressure from a spacer is suppressed. Therefore, an increase in reaction force in at least one of a pair of first side walls of the prismatic secondary battery can be suppressed by bringing the conditions in which the spacer presses into particular conditions.

When viewed in the direction perpendicular to the other of the pair of first side walls, the area of a region pressed by each spacer, the region being in a region that lies in the other of the pair of first side walls and overlaps at least one of the first region and the second region, is preferably 20% or less of the area of the region that lies in the other of the pair of first side walls and overlaps at least one of the first region and the second region. When viewed in the direction perpendicular to the other of the pair of first side walls, the area of a region pressed by each spacer, the region being in a region that lies in the other of the pair of first side walls and overlaps at least one of the third region and the fourth region, is preferably 20% or less of the area of the region that lies in the other of the pair of first side walls and overlaps at least one of the third region and the fourth region.

In the pair of first side walls of the prismatic secondary battery, an increase in reaction force can be suppressed effectively by preventing particular regions from being pressed by each spacer.

When viewed in the direction perpendicular to one of the pair of first side walls, a region that lies in the one of the pair of first side walls and overlaps the flat portion and a region located between the first region and the third region is preferably pressed by the spacer. When viewed in the direction perpendicular to the other of the pair of first side walls, a region that lies in the other of the pair of first side walls and overlaps the flat portion and a region located between the first region and the third region is preferably pressed by the spacer.

A region that opposes the power generation part of the wound electrode body and hardly expands in the pair of first side walls of the prismatic secondary battery is preferably pressed by the spacer. Such a configuration can assuredly prevent the wound electrode body from moving in the prismatic outer body even if a strong shock or vibration is applied to the battery pack.

When viewed in the direction perpendicular to one of the pair of first side walls, the area of a region pressed by the spacer, the region being in a region that lies in the one of the pair of first side walls and overlaps the flat portion but does not overlap the first region, the second region, the third region, or the fourth region, is preferably 70% or more of the area of the region that lies in the one of the pair of first side walls and overlaps the flat portion but does not overlap the first region, the second region, the third region, or the fourth region.

A region that opposes the power generation part of the wound electrode body and hardly expands in at least one of the pair of first side walls of the prismatic secondary battery is preferably pressed by the spacer. Such a configuration can assuredly prevent the wound electrode body from moving in the prismatic outer body even if a strong shock or vibration is applied to the battery pack.

When viewed in the direction perpendicular to the other of the pair of first side walls, the area of a region pressed by the spacer, the region being in a region that lies in the other of the pair of first side walls and overlaps the flat portion but does not overlap the first region, the second region, the third region, or the fourth region, is preferably 70% or more of the area of the region that lies in the other of the pair of first side walls and overlaps the flat portion but does not overlap the first region, the second region, the third region, or the fourth region.

A region that opposes the power generation part of the wound electrode body and hardly expands in the pair of first side walls of the prismatic secondary battery is preferably pressed by the spacer. Such a configuration can more assuredly prevent the wound electrode body from moving in the prismatic outer body even if a strong shock or vibration is applied to the battery pack. The spacer may press different portions for each of a pair of first side walls of the prismatic secondary battery.

When viewed in the direction perpendicular to one of the pair of first side walls, a first recess is preferably provided in a portion of the spacer, the portion opposing a region that lies in the one of the pair of first side walls and overlaps at least one of the first region and the second region. When viewed in the direction perpendicular to one of the pair of first side walls, a second recess is preferably provided in a portion of the spacer, the portion opposing a region that lies in the one of the pair of first side walls and overlaps at least one of the third region and the fourth region.

The spacer preferably has recesses in particular regions of the surfaces that oppose the first side walls of the prismatic secondary batteries. This structure prevents particular regions of the first side walls of the prismatic secondary batteries from being pressed by the spacer.

Advantageous Effects of Invention

The embodiments of the present invention can avoid a damage or fracture of a battery pack which may be caused by expansion of prismatic secondary batteries.

BRIEF DESCRIPTION OF THE SEVERAL VIEWS OF THE DRAWINGS

FIG. 2A is a sectional view taken along line IIA-IIA in FIG. 1, and FIG. 2B is a sectional view taken along line IIB-IIB in FIG. 1;

DETAILED DESCRIPTION OF THE INVENTION

Figure 1:
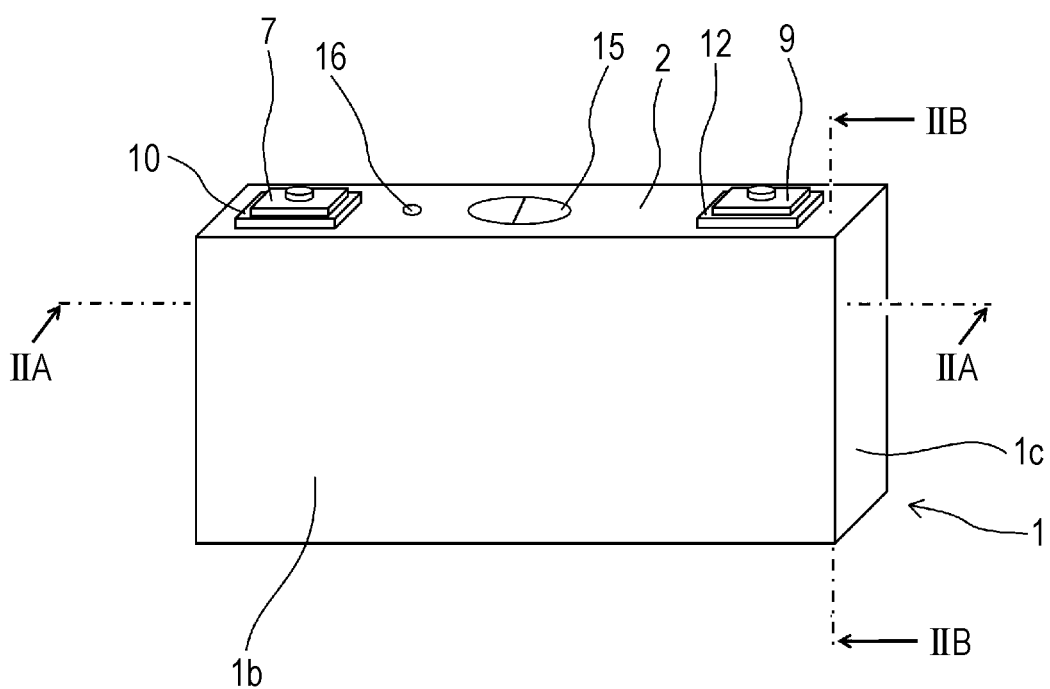
FIG. 1 is a perspective view of a prismatic secondary battery according to an embodiment.

First, a prismatic secondary battery 20 according to an embodiment will be described. FIG. 1 is a perspective view of a prismatic secondary battery 20. FIG. 2A is a sectional view taken along line IIA-IIA in FIG. 1. FIG. 2B is a sectional view taken along line IIB-IIB in FIG. 1. The prismatic secondary battery 20 has a battery case including a prismatic outer body 1 that has an opening and a bottomed prismatic tubular shape and a sealing plate 2 that seals the opening of the prismatic outer body 1. The prismatic outer body 1 has a bottom 1a, a pair of first side walls 1b, and a pair of second side walls 1c. The pair of first side walls 1b are disposed to oppose each other. The pair of second side walls 1c are disposed to oppose each other. The first side walls 1b are larger in area than the second side walls 1c.

The prismatic outer body 1 contains a flat wound electrode body 3 in which a long positive electrode plate 40 and a long negative electrode plate 50 are wound with a long separator interposed therebetween. The wound electrode body 3 is placed in the prismatic outer body 1 such that the winding axis of the wound electrode body 3 is parallel to the bottom 1a of the prismatic outer body 1. The wound electrode body 3 has a wound positive electrode core-exposed portion 4 at one end portion in the direction in which the winding axis extends and has a wound negative electrode core-exposed portion 5 at the other end portion. The wound electrode body 3 has a pair of flat outer surfaces and a pair of curved outer surfaces which connects the pair of flat outer surfaces. The pair of flat outer surfaces are disposed to oppose the first side walls 1b, respectively. The wound positive electrode core-exposed portion 4 and the wound negative electrode core-exposed portion 5 are disposed to oppose the second side walls 1c, respectively. An electrically insulating resin sheet 14 is disposed between the prismatic outer body 1 and the wound electrode body 3.

A positive electrode current collector 6 is connected to the outer surface of the wound positive electrode core-exposed portion 4. A positive electrode terminal 7 is attached to the sealing plate 2. The positive electrode current collector 6 is electrically connected to the positive electrode terminal 7. An external insulating member 10 made of a resin is disposed between the positive electrode terminal 7 and the sealing plate 2. An internal insulating member 11 made of a resin is disposed between the positive electrode current collector 6 and the sealing plate 2.

A negative electrode current collector 8 is connected to the outer surface of the wound negative electrode core-exposed portion 5. A negative electrode terminal 9 is attached to the sealing plate 2. The negative electrode current collector 8 is electrically connected to the negative electrode terminal 9. An external insulating member 12 made of a resin is disposed between the negative electrode terminal 9 and the sealing plate 2. An internal insulating member 13 made of a resin is disposed between the negative electrode current collector 8 and the sealing plate 2.

A positive electrode current collector-supporting member (not shown) is connected to the surface of the wound positive electrode core-exposed portion 4 opposite to the surface to which the positive electrode current collector 6 is connected. A negative electrode current collector-supporting member 80 is connected to the surface of the wound negative electrode core-exposed portion 5 opposite to the surface to which the negative electrode current collector 8 is connected. The positive electrode current collector-supporting member and the negative electrode current collector-supporting member 80 are not essential members and can be omitted.

The positive electrode current collector 6 includes a connection part 6a connected to the positive electrode core-exposed portion 4, a base part 6c disposed between the sealing plate 2 and the wound electrode body 3, and a lead part 6b that extends from the base part 6c toward the wound electrode body 3 and connects the base part 6c and the connection part 6a. The connection part 6a is disposed on the wound positive electrode core-exposed portion 4. The negative electrode current collector 8 includes a connection part 8a connected to the negative electrode core-exposed portion 5, a base part 8c disposed between the sealing plate 2 and the wound electrode body 3, and a lead part 8b that extends from the base part 8c toward the wound electrode body 3 and connects the base part 8c and the connection part 8a. The connection part 8a is disposed on the wound negative electrode core-exposed portion 5.

The sealing plate 2 has a gas release valve 15. The gas release valve 15 breaks when the internal pressure of the prismatic outer body 1 reaches a predetermined value or higher. The gas in the prismatic outer body 1 is released out of the prismatic outer body 1 through the gas release valve 15. The sealing plate 2 has an electrolyte solution injection port, and the electrolyte solution injection port is sealed with a sealing plug 16.

Next, a battery pack 100 including plural prismatic secondary batteries 20 will be described.

Figure 3:
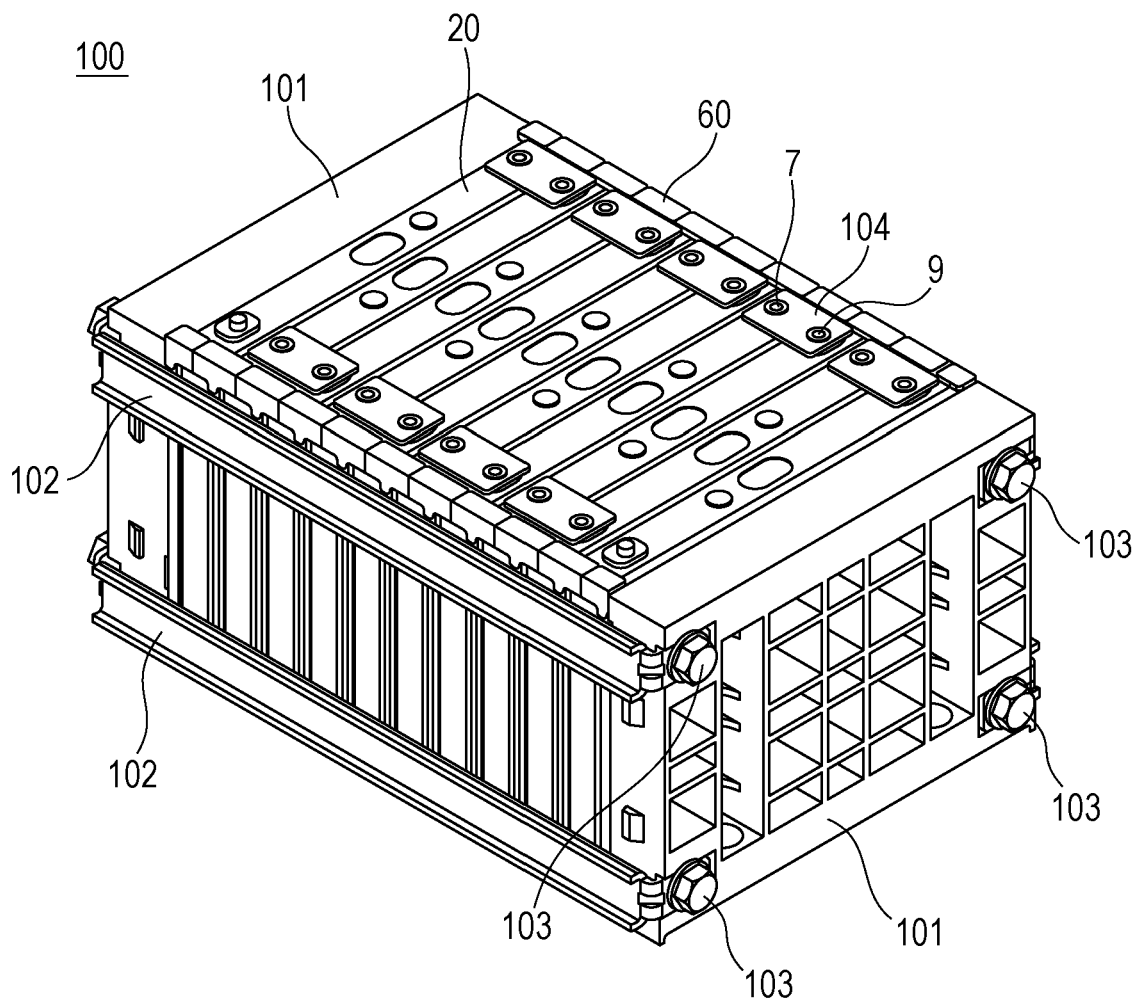
FIG. 3 is a perspective view of a battery pack according to an embodiment.

FIG. 3 is a perspective view of the battery pack 100. Ten prismatic secondary batteries 20 are disposed between a pair of end plates 101 made of a metal. The pair of end plates 101 are connected to each other with binding bars 102 made of a metal. Each binding bar 102 is fixed to the end plates 101 by means of bolts 103. The battery pack 100 has two binding bars 102 on one side surface and two binding bars 102 on the other side surface.

Spacers 60 made of a resin are each disposed between adjacent prismatic secondary batteries 20. The prismatic secondary batteries 20 are disposed such that their first side walls 1b oppose each other with the spacers 60 each interposed therebetween. The positive electrode terminal 7 of a prismatic secondary battery 20 is electrically connected to the negative electrode terminal 9 of an adjacent prismatic secondary battery 20 by means of busbars 104 made of a metal. The battery pack 100 is configured such that the spacers 60 each press the first side walls 1b of the prismatic outer bodies 1 of opposing prismatic secondary batteries 20.

Next, a method for producing the prismatic secondary battery 20 will be described.

Production of Positive Electrode Plate

A positive electrode active material mixture slurry is produced by kneading $LiNi_{0.35}Co_{0.35}Mn_{0.30}O_2$ serving as a positive electrode active material, polyvinylidene fluoride (PVdF) serving as a binder, carbon black serving as a conductive agent, and N-methyl-2-pyrrolidone (NMP) serving as a dispersion medium such that the mass ratio of the positive electrode active material, the binder, and the conductive agent is 91:7:2.

The positive electrode active material mixture slurry is applied to both sides of an aluminum foil, 15 μm in thickness, serving as a positive electrode core. The positive electrode active material mixture slurry is then dried to remove NMP in the positive electrode active material mixture slurry. This forms positive electrode active material mixture layers. The positive electrode active material mixture layers are then compressed with a compression roller so as to obtain a predetermined packing density. The obtained product is cut in a predetermined shape to provide a positive electrode plate 40.

The packing density of each positive electrode active material mixture layer after compression is 2.5 g/cm³. The positive electrode plate 40 is 440 cm long and 13 cm wide. In the positive electrode plate 40, each positive electrode active material mixture layer 40b is 11 cm wide.

Figure 4:
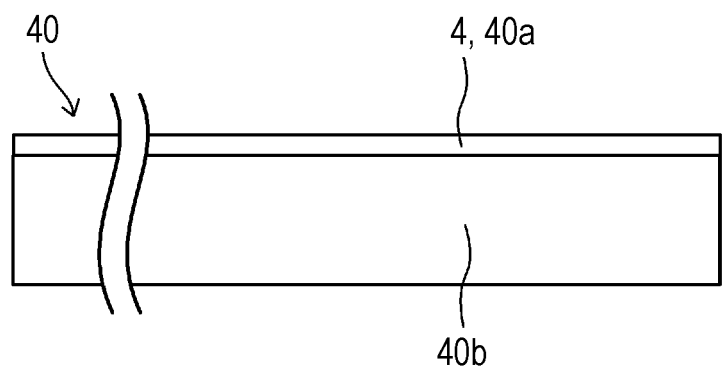
FIG. 4 is a plan view of a positive electrode plate.

FIG. 4 is a plan view of the positive electrode plate 40. The positive electrode plate 40 includes a long positive electrode core 40a and a positive electrode active material mixture layer 40b on each surface of the positive electrode core 40a. The positive electrode core 40a has a positive electrode core-exposed portion 4 at an end portion in the width direction. The positive electrode core-exposed portion 4 has no positive electrode active material mixture layer 40b on each surface in the longitudinal direction.

Production of Negative Electrode Plate

A negative electrode active material mixture slurry is produced by kneading graphite serving as a negative electrode active material, styrene-butadiene rubber (SBR) serving as a binder, carboxymethyl cellulose (CMC) serving as a thickener, and water such that the mass ratio of the negative electrode active material, the binder, and the thickener is 98:1:1.

The negative electrode active material mixture slurry is applied to both sides of a copper foil, 8 μm in thickness, serving as a negative electrode core. The negative electrode active material mixture slurry is then dried to remove water in the negative electrode active material mixture slurry. This forms negative electrode active material mixture layers. The negative electrode active material mixture layers are then compressed with a compression roller so as to obtain a predetermined packing density. The obtained product is cut in a predetermined shape to provide a negative electrode plate 50.

The packing density of each negative electrode active material mixture layer after compression is 1.1 g/cm³. The negative electrode plate 50 is 460 cm long and 13 cm wide. In the negative electrode plate 50, each negative electrode active material mixture layer 50b is 12 cm wide.

Figure 5:
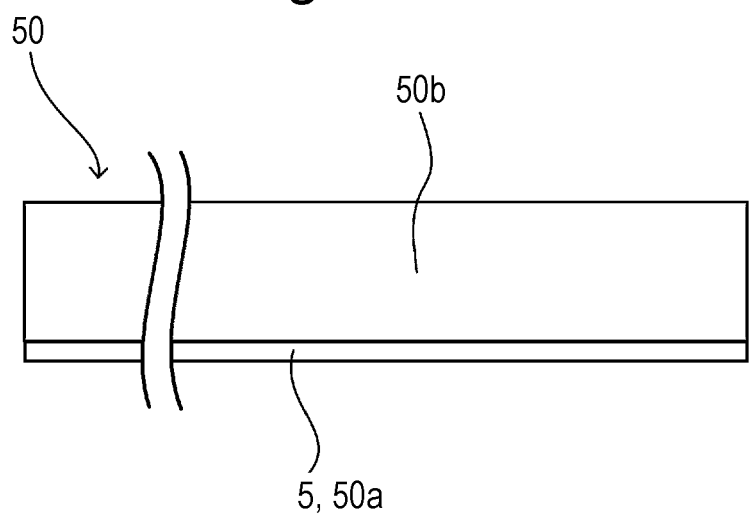
FIG. 5 is a plan view of a negative electrode plate.

FIG. 5 is a plan view of the negative electrode plate 50. The negative electrode plate 50 includes a long negative electrode core 50a and a negative electrode active material mixture layer 50b that is formed on each surface of the negative electrode core 50a. The negative electrode core 50a has a negative electrode core-exposed portion 5 at an end portion in the width direction. The negative electrode core-exposed portion 5 has no negative electrode active material mixture layer 50b on each surface in the longitudinal direction.

Production of Wound Electrode Body

The long positive electrode plate 40 and the long negative electrode plate 50, which are produced by the above-described methods, are wound with a long three-layer separator interposed therebetween and are then pressed to form a flat shape. The separator is 20 μm thick and composed of polypropylene/polyethylene/polypropylene. The obtained flat wound electrode body 3 has the wound positive electrode core-exposed portion 4 at one end portion in the direction in which the winding axis extends. The flat wound electrode body 3 has the wound negative electrode core-exposed portion 5 at the other end portion.

The length of the flat wound electrode body 3 in the direction in which the winding axis extends is 140 mm. The length of the flat wound electrode body 3 in the direction perpendicular to the direction in which the winding axis extends is 58 mm. The flat wound electrode body 3 is 15 mm thick. The winding number of the positive electrode plate 40 is 80. As described above, the width of the positive electrode active material mixture layer 40b is smaller than the width of the negative electrode active material mixture layer 50b. Therefore, the width (the length in the direction in which the winding axis extends) of the power generation part is 11 cm, which is the same as the width of the positive electrode active material mixture layer 40b.

Preparation of Non-Aqueous Electrolyte Solution

A solvent mixture is prepared by mixing ethylene carbonate (EC), ethyl methyl carbonate (EMC), and diethyl carbonate (DEC) at a volume ratio (25° C., 1 atm) of 30:30:40. To this solvent mixture, 1 mol/L of $LiPF_6$ is added. Vinylene carbonate (VC) is further added in an amount of 0.3% by mass relative to the total mass of a non-aqueous electrolyte solution, and lithium bis(oxalato)borate is added in an amount of 1% by mass relative to the total mass of the non-aqueous electrolyte solution.

Attachment of Components to Sealing Plate

An external insulating member 10 is disposed on the battery outer side of the periphery of a positive electrode terminal attachment hole (not shown) provided in the sealing plate 2. The internal insulating member 11 and the base part 6c of the positive electrode current collector 6 are disposed on the battery inner side of the periphery of the positive electrode terminal attachment hole (not shown) provided in the sealing plate 2. The positive electrode terminal 7 is inserted from the battery outer side into the through-hole of the external insulating member 10, the positive electrode terminal attachment hole, the through-hole of the internal insulating member 11, and the through-hole of the base part 6c of the positive electrode current collector 6. An end of the positive electrode terminal 7 is crimped onto the base part 6c of the positive electrode current collector 6. The positive electrode terminal 7 and the positive electrode current collector 6 are fixed to the sealing plate 2 accordingly. The positive electrode terminal 7 and the base part 6c are preferably welded together.

An external insulating member 12 is disposed on the battery outer side of the periphery of a negative electrode terminal attachment hole (not shown) provided in the sealing plate 2. The internal insulating member 13 and the base part 8c of the negative electrode current collector 8 are disposed on the battery inner side of the periphery of the negative electrode terminal attachment hole (not shown) provided in the sealing plate 2. The negative electrode terminal 9 is inserted from the battery outer side into the through-hole of the external insulating member 12, the negative electrode terminal attachment hole, the through-hole of the internal insulating member 13, and the through-hole of the base part 8c of the negative electrode current collector 8. An end of the negative electrode terminal 9 is crimped onto the base part 8c of the negative electrode current collector 8. The negative electrode terminal 9 and the negative electrode current collector 8 are fixed to the sealing plate 2 accordingly. The negative electrode terminal 9 and the base part 8c are preferably welded together.

Attachment of Current Collector to Wound Electrode Body

Figure 6:
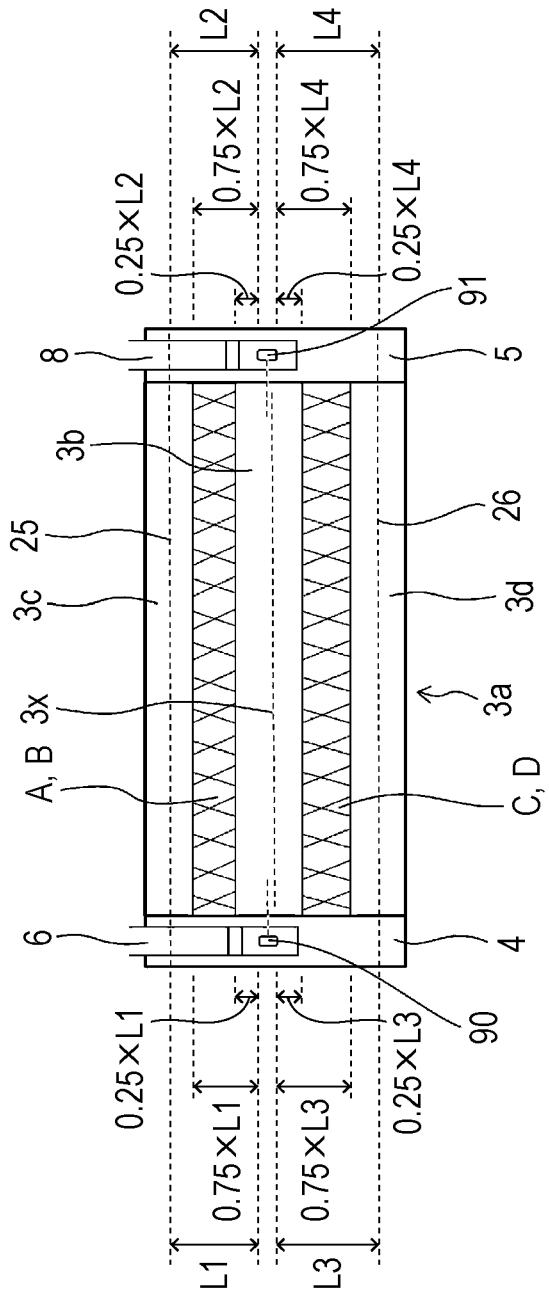
FIG. 6 is a plan view of a wound electrode body according to an embodiment.

FIG. 6 illustrates the surface of the flat wound electrode body 3 to which the positive electrode current collector 6 and the negative electrode current collector 8 are connected to the surface. As illustrated in FIG. 6, the positive electrode current collector 6 is connected to the outer surface of the wound positive electrode core-exposed portion 4. A positive electrode-joined portion 90 is formed in the positive electrode current collector 6 and the positive electrode core-exposed portion 4 by welding. The negative electrode current collector 8 is connected to the outer surface of the wound negative electrode core-exposed portion 5. A negative electrode-joined portion 91 is formed in the negative electrode current collector 8 and the negative electrode core-exposed portion 5 by welding. Such connection is performed by, for example, resistance welding or ultrasonic welding. In the case of resistance welding, a positive electrode current collector-supporting member is preferably connected to the outer surface of the wound positive electrode core-exposed portion 4 opposite to the outer surface to which the positive electrode current collector 6 is connected, and a negative electrode current collector-supporting member 80 is preferably connected to the outer surface of the wound negative electrode core-exposed portion 5 opposite to the outer surface to which the negative electrode current collector 8 is connected.

Assembly of Prismatic Secondary Battery

The flat wound electrode body 3 is covered with the resin sheet 14 and inserted into the prismatic outer body 1. The sealing plate 2 and the prismatic outer body 1 are then welded, so that the opening of the prismatic outer body 1 is sealed with the sealing plate 2. A non-aqueous electrolyte solution is then injected through an electrolyte solution injection port provided in the sealing plate 2, and the electrolyte solution injection port is sealed with the sealing plug 16. The prismatic secondary battery 20 is produced accordingly. The capacity of the prismatic secondary battery 20 is 8 Ah.

Each Region in Flat Wound Electrode Body

As illustrated in FIG. 6, the positive electrode current collector 6 is joined to the outer surface of the wound positive electrode core-exposed portion 4 by welding to form a positive electrode-joined portion 90. The negative electrode current collector 8 is joined to the outer surface of the wound negative electrode core-exposed portion 5 by welding to form a negative electrode-joined portion 91. The positive electrode-joined portion 90 and the negative electrode-joined portion 91 are formed by, for example, resistance welding, ultrasonic welding, or irradiation with energy rays such as laser beams. The positive electrode-joined portion 90 is formed so as to span the entire range of the positive electrode core in the layering direction. That is, the wound positive electrode core-exposed portion 4 is held together by the positive electrode-joined portion 90. The negative electrode-joined portion 91 is formed so as to span the entire range of the negative electrode core in the layering direction. That is, the wound negative electrode core-exposed portion 5 is held together by the negative electrode-joined portion 91.

The center of the positive electrode-joined portion 90 in the direction perpendicular to the bottom 1a of the prismatic outer body 1 (vertical direction in FIG. 6) is nearer to the sealing plate 2 than the center line 3x of the wound electrode body 3. The center of the negative electrode-joined portion 91 in the direction perpendicular to the bottom 1a of the prismatic outer body 1 (vertical direction in FIG. 6) is nearer to the sealing plate 2 than the center line 3x of the wound electrode body 3. Such a configuration results in a short electrical pathway between the positive electrode plate 40 and the positive electrode terminal 7 and a short electrical pathway between the negative electrode plate 50 and the negative electrode terminal 9, which provides a prismatic secondary battery having good output characteristics.

The flat wound electrode body 3 has a power generation part 3a in a center portion in the direction in which the winding axis extends. In the power generation part 3a, the positive electrode active material mixture layer 40b and the negative electrode active material mixture layer 50b are layered with the separator interposed therebetween. The power generation part 3a has a flat portion 3b having a flat outer surface, a first curved portion 3c having a curved outer surface and located nearer to the sealing plate 2, and a second curved portion 3d having a curved outer surface and located nearer to the bottom 1a of the prismatic outer body 1. The boundary between the first curved portion 3c and the flat portion 3b is defined as a first boundary 25. The first boundary 25 extends in the direction in which the winding axis extends. The boundary between the second curved portion 3d and the flat portion 3b is defined as a second boundary 26. The second boundary 26 extends in the direction in which the winding axis extends.

In the direction perpendicular to the bottom 1a of the prismatic outer body 1, the distance between the first boundary 25 and a sealing plate 2-side end of the positive electrode-joined portion 90 is denoted by L1. In the direction perpendicular to the bottom 1a of the prismatic outer body 1, a region of the power generation part 3a, the region extending toward the first boundary 25 from a position 0.25×L1 to a position 0.75×L1 distant from the sealing plate 2-side end of the positive electrode-joined portion 90, is defined as a first region A.

In the direction perpendicular to the bottom 1a of the prismatic outer body 1, the distance between the first boundary 25 and a sealing plate 2-side end of the negative electrode-joined portion 91, which is on the negative electrode side, is denoted by L2. In the direction perpendicular to the bottom 1a of the prismatic outer body 1, a region of the power generation part 3a, the region extending toward the first boundary 25 from a position 0.25×L2 to a position 0.75×L2 distant from the sealing plate 2-side end of the negative electrode-joined portion 91, is defined as a second region B.

In the prismatic secondary battery 20 according to the embodiment, the sealing plate 2-side end of the positive electrode-joined portion 90 is located at the same position as the sealing plate 2-side end of the negative electrode-joined portion 91 in the direction perpendicular to the bottom 1a of the prismatic outer body 1. Therefore, the first region A is equivalent to the second region B.

In the direction perpendicular to the bottom 1a of the prismatic outer body 1, the distance between the second boundary 26 and a bottom 1a-side end of the positive electrode-joined portion 90 is denoted by L3. In the direction perpendicular to the bottom 1a of the prismatic outer body 1, a region of the power generation part 3a, the region extending toward the second boundary 26 from a position 0.25×L3 to a position 0.75×L3 distant from the bottom 1a-side end of the positive electrode-joined portion 90, is defined as a third region C.

In the direction perpendicular to the bottom 1a of the prismatic outer body 1, the distance between the second boundary 26 and a bottom 1a-side end of the negative electrode-joined portion 91 is denoted by L4. In the direction perpendicular to the bottom 1a of the prismatic outer body 1, a region of the power generation part 3a, the region extending toward the second boundary 26 from a position 0.25×L4 to a position 0.75×L4 distant from the bottom 1a-side end of the negative electrode-joined portion 91, is defined as a fourth region D.

In the prismatic secondary battery 20 according to the embodiment, the bottom 1a-side end of the positive electrode-joined portion 90 is located at the same position as the bottom 1a-side end of the negative electrode-joined portion 91 in the direction perpendicular to the bottom 1a of the prismatic outer body 1. Therefore, the third region C is equivalent to the fourth region D.

The inventors of the present invention have found that the following regions of the flat wound electrode body 3 expand more easily particularly due to charging and discharging or other factors than other regions: regions at particular distances from the positive electrode-joined portion 90 between the positive electrode core-exposed portion 4 and the positive electrode current collector 6; and regions at particular distances from the negative electrode-joined portion 91 between the negative electrode core-exposed portion 5 and the negative electrode current collector 8. More specifically, the inventors have found that the first region A, the second region B, the third region C, and the fourth region D in the flat wound electrode body 3 expand more easily particularly due to charging and discharging or other factors than other regions.

The reason for this is supposed as described below. As the charge/discharge cycle proceeds, the flat wound electrode body 3 expands due to, for example, cracking of active materials, expansion of active materials, and accumulation of deposits onto the negative electrode active material mixture layers. In the flat wound electrode body 3, the positive electrode plate 40 and the negative electrode plate 50 in regions near the positive electrode-joined portion 90 and the negative electrode-joined portion 91 are strongly held by the positive electrode-joined portion 90 and the negative electrode-joined portion 91 in the layering direction, respectively. In the flat wound electrode body 3, regions near the positive electrode-joined portion 90 and the negative electrode-joined portion 91 are thus unlikely to expand. In the first curved portion 3c and the second curved portion 3d, the positive electrode plate 40 and the negative electrode plate 50 are layered in a curved state, and these regions are difficult to expand. As a result, distortion accumulates in regions near the positive electrode-joined portion 90 and the negative electrode-joined portion 91 where expansion is unlikely to occur and in a region between the first curved portion 3c and the second curved portion 3d. Such accumulation of distortion may facilitate expansion of portions at predetermined distances from the positive electrode-joined portion 90 and the negative electrode-joined portion 91 in the direction perpendicular to the winding axis (the direction perpendicular to the bottom 1a of the prismatic outer body 1).

In the battery pack 100 according to the embodiment, when viewed in the direction perpendicular to one first side wall 1b of the prismatic outer body 1, regions that lie in the first side wall 1b of the prismatic secondary battery 20 and overlap the first region A, the second region B, the third region C, and the fourth region D in the flat wound electrode body 3 are substantially free of pressure from the spacer 60, which suppresses an increase in reaction force.

Figure 7:
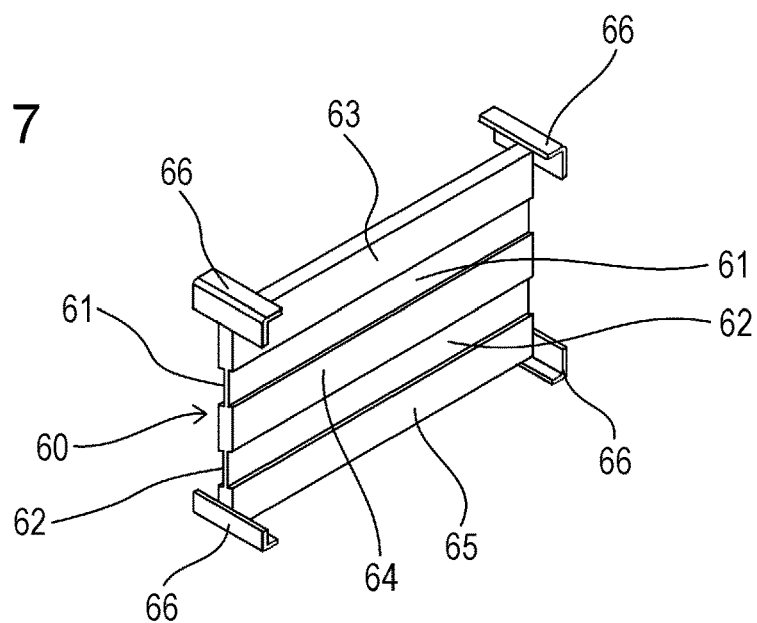
FIG. 7 is a perspective view of a spacer according to an embodiment.

In the battery pack 100 according to the embodiment, the spacer 60 made of a resin as illustrated in FIG. 7 is disposed between adjacent prismatic secondary batteries 20. The spacer 60 has an upper recess 61 at positions corresponding to the first region A and the second region B of the wound electrode body 3. The spacer 60 has the upper recess on each surface thereof. The spacer 60 has a lower recess 62 at positions corresponding to the third region C and the fourth region D of the wound electrode body 3. The spacer 60 has the lower recess 62 on each surface. In the battery pack 100, when viewed in the direction perpendicular to one first side wall 1b of the prismatic outer body 1, a region that lies in one first side wall 1b and overlaps at least one of the first region A, the second region B, the third region C, and the fourth region D is free of pressure from the spacer 60.

In the battery pack 100, an increase in reaction force can be suppressed even if the charge/discharge cycle of the prismatic secondary battery 20 proceeds. This provides a highly reliable battery pack.

When viewed in the direction perpendicular to one first side wall 1b of the prismatic outer body 1, a region that lies in one first side wall 1b and overlaps at least one of the first region A, the second region B, the third region C, and the fourth region D, is not necessarily completely free of pressure from the spacer 60. For example, when viewed in the direction perpendicular to one first side wall 1b of the prismatic outer body 1, the percentage of a region pressed by the spacer 60 in a region that lies in one first side wall 1b and overlaps at least one of the first region A and the second region B is preferably 20% or less, more preferably 10% or less, and still more preferably 5% or less. When viewed in the direction perpendicular to one first side wall 1b of the prismatic outer body 1, the percentage of a region pressed by the spacer 60 in a region that lies in one first side wall 1b and overlaps at least one of the third region C and the fourth region D is preferably 20% or less, more preferably 10% or less, and still more preferably 5% or less.

When viewed in the direction perpendicular to one of a pair of first side walls 1b, the area of a region pressed by the spacer 60, the region being in a region that lies in the one of the pair of first side walls 1b and overlaps the flat portion 3b of the power generation part 3a but does not overlap the first region A, the second region B, the third region C, or the fourth region D, is preferably 70% or more, and more preferably 80% or more of the area of the region that lies in the one of the pair of first side walls 1b and overlaps the flat portion 3b of the power generation part 3a but does not overlap the first region A, the second region B, the third region C, or the fourth region D.

When viewed in the direction perpendicular to the other of the pair of first side walls 1b, the area of a region pressed by the spacer 60, the region being in a region that lies in the other of the pair of first side walls 1b and overlaps the flat portion 3b of the power generation part 3a but does not overlap the first region A, the second region B, the third region C, or the fourth region D, is preferably 70% or more, and more preferably 80% or more of the area of the region that lies in the other of the pair of first side walls 1b and overlaps the flat portion 3b of the power generation part 3a but does not overlap the first region A, the second region B, the third region C, or the fourth region D.

The spacer 60 has an upper pressing portion 63, a center pressing portion 64, and a lower pressing portion 65 on each surface. The upper pressing portion 63, the center pressing portion 64, and the lower pressing portion 65 each press the first side wall 1b of the prismatic outer body 1. The spacer 60 preferably has wall portions 66 at four respective corners to prevent displacement of prismatic secondary batteries 20.

Samples 1 to 4 are produced by using the prismatic secondary battery 20 according to the embodiment, and the following test is carried out. The prismatic secondary battery 20 is 148 mm in width, 65 mm in height, and 17.5 mm in thickness. The prismatic secondary battery 20 used for Samples 1 to 4 is the prismatic secondary battery 20 that has been once charged up to 100% state of charge (SOC) of and then discharged down to 20% SOC.

Figure 8:
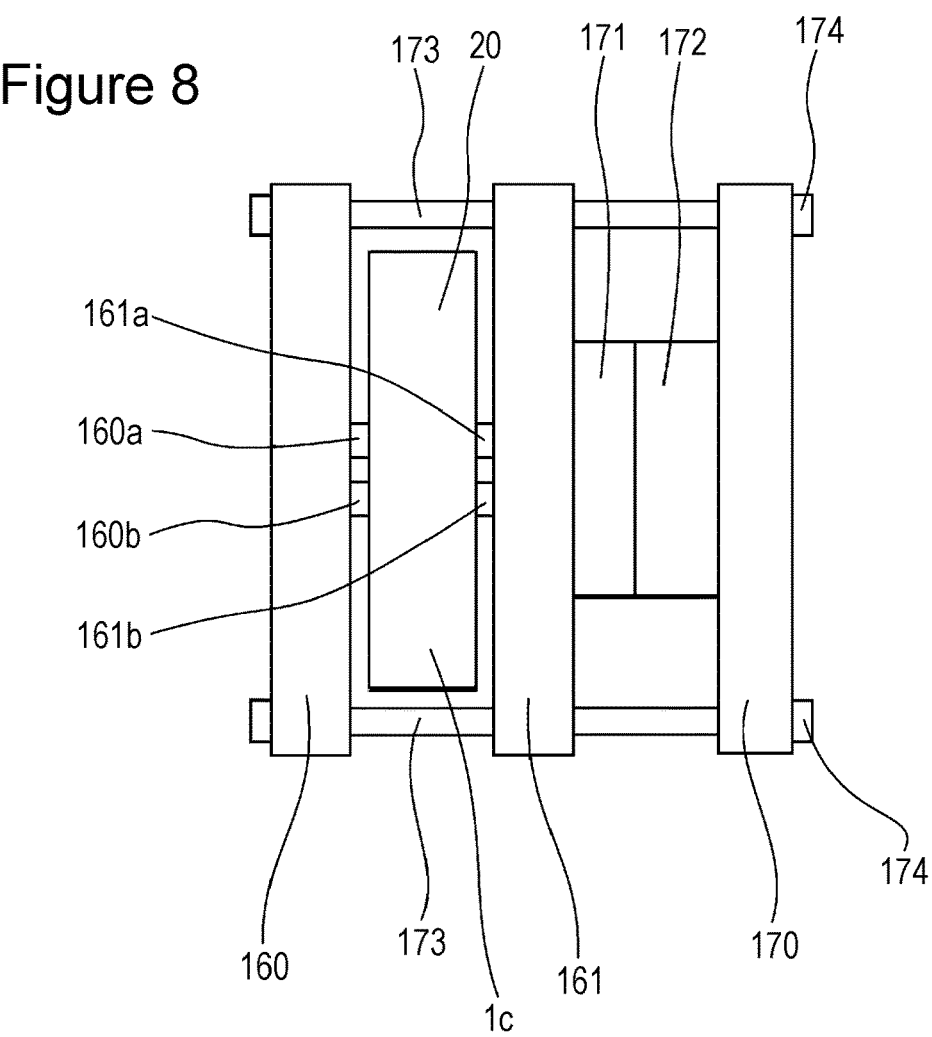
FIG. 8 is a figure for describing the structure of each sample.

First, the components common to Samples 1 to 4 will be described with reference to FIG. 8. FIG. 8 is a side view of Samples 1 to 4. A first pressing jig 160 includes a stainless steel plate having a thickness of 13 mm, a first pressing portion 160a having a thickness of 2 mm and made of polypropylene, and a second pressing portion 160b having a thickness of 2 mm and made of polypropylene. The first and second pressing portions 160a and 160b are bonded to one surface of the stainless steel plate and distant from each other. A second pressing jig 161 includes a stainless steel plate having a thickness of 13 mm, a third pressing portion 161a having a thickness of 2 mm and made of polypropylene, and a fourth pressing portion 161b having a thickness of 2 mm and made of polypropylene. The third and fourth pressing portions 161a and 161b are bonded to one surface of the stainless steel plate and distant from each other.

The first pressing portion 160a, the second pressing portion 160b, the third pressing portion 161a, and the fourth pressing portion 161b extend in the direction in which the winding axis of the flat wound electrode body 3 extends. In the direction in which the winding axis of the flat wound electrode body 3 extends, the first pressing portion 160a, the second pressing portion 160b, the third pressing portion 161a, and the fourth pressing portion 161b are each longer than the flat wound electrode body 3.

The first pressing jig 160 is disposed such that the first pressing portion 160a and the second pressing portion 160b contact one first side wall 1b of the prismatic secondary battery 20. The second pressing jig 161 is disposed such that the third pressing portion 161a and the fourth pressing portion 161b contact the other first side wall 1b of the prismatic secondary battery 20. A base plate 170 made of stainless steel and having a thickness of 19 mm is disposed on the side of the surface of the second pressing jig 161 opposite to the surface having the third pressing portion 161a and the fourth pressing portion 161b while an intermediate plate 171 made of stainless steel and having a thickness of 15 mm and a load cell 172 (model CMP1-2T available from Minebea Co., Ltd.) are disposed between the second pressing jig 161 and the base plate 170. Bolts 173 are each inserted into through-holes at four respective corners of the first pressing jig 160, the second pressing jig 161, and the base plate 170, and these members are hold and secured by means of nuts 174. The load applied to the load cell 172 when the distance between the first pressing portion 160a of the first pressing jig 160 and the third pressing portion 161a of the second pressing jig 161 is 17.3 mm is measured as an initial reaction force of each sample.

Samples 1 to 4 described below have the same structure except for the positions of the first pressing portion 160a and the second pressing portion 160b of the first pressing jig 160 and the positions of the third pressing portion 161a and the fourth pressing portion 161b of the second pressing jig 161.

Sample 1

Figure 9:
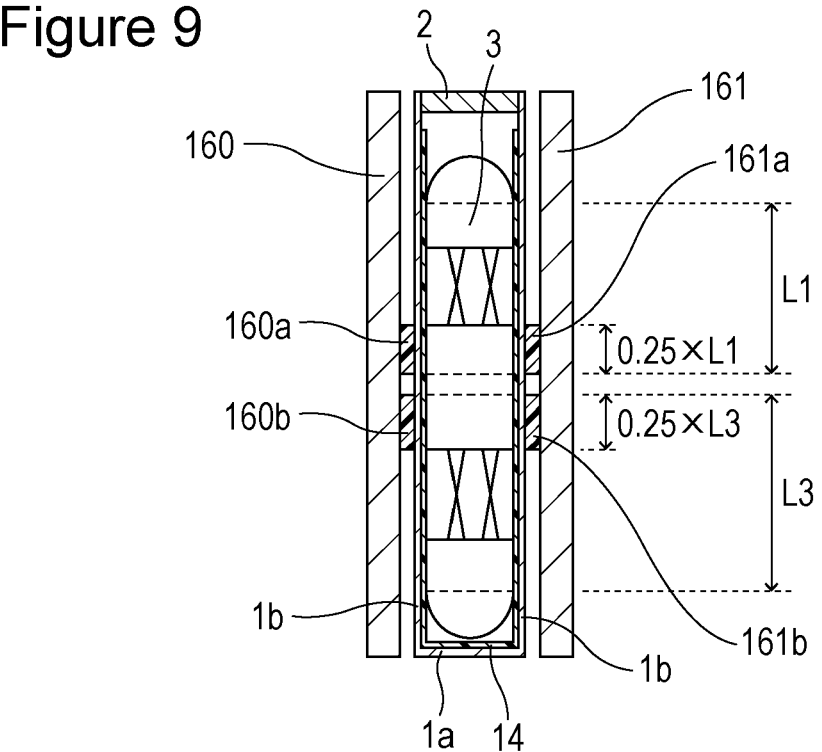
FIG. 9 is a view of the cross sections of a prismatic secondary battery and pressing jigs in Sample 1.

FIG. 9 is a view of the cross sections of the prismatic secondary battery 20, the first pressing jig 160, and the second pressing jig 161 in Sample 1, where the cross sections are parallel to the second side walls 1c. In Sample 1, the first pressing portion 160a and the third pressing portion 161a each press a region of the power generation part 3a of the flat wound electrode body 3, the region being located between the sealing plate 2-side end of the positive electrode-joined portion 90 and a position 0.25×L1 distant from the sealing plate 2-side end of the positive electrode-joined portion 90. Here, L1 denotes the distance between the first boundary 25 and the sealing plate 2-side end of the positive electrode-joined portion 90 as described above. In Sample 1, the second pressing portion 160b and the fourth pressing portion 161b each press a region of the power generation part 3a of the flat wound electrode body 3, the region being located between the bottom 1a-side end of the positive electrode-joined portion 90 and a position 0.25×L3 distant from the bottom 1a-side end of the positive electrode-joined portion 90. Here, L3 denotes the distance between the second boundary 26 and the bottom 1a-side end of the positive electrode-joined portion 90 as described above.

Sample 2

Figure 10:
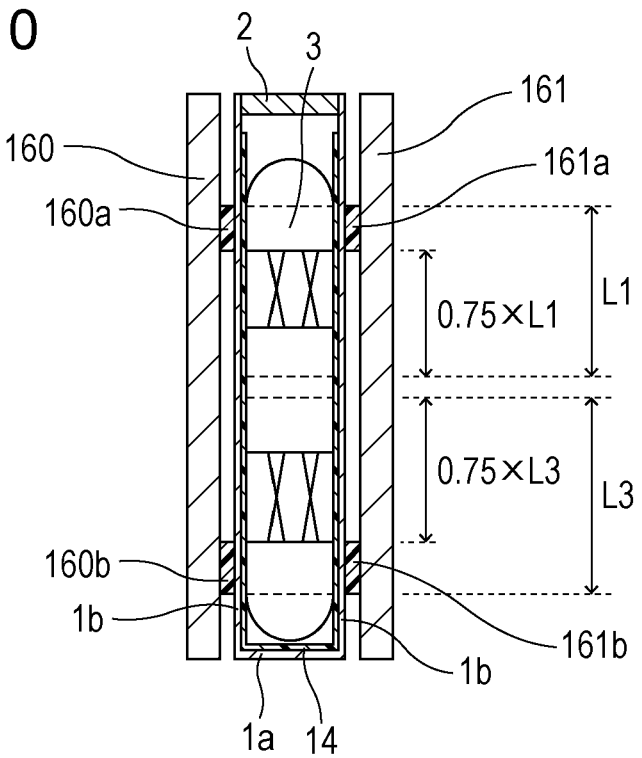
FIG. 10 is a view of the cross sections of a prismatic secondary battery and pressing jigs in Sample 2.

FIG. 10 is a view of the cross sections of the prismatic secondary battery 20, the first pressing jig 160, and the second pressing jig 161 in Sample 2, where the cross sections are parallel to the second side walls 1c. In Sample 2, the first pressing portion 160a and the third pressing portion 161a each press a region of the power generation part 3a of the flat wound electrode body 3, the region being located between a position 0.75×L1 distant from the sealing plate 2-side end of the positive electrode-joined portion 90 and a position (first boundary 25) L1 distant from the sealing plate 2-side end of the positive electrode-joined portion 90. The second pressing portion 160b and the fourth pressing portion 161b each press a region of the power generation part 3a of the flat wound electrode body 3, the region being located between a position 0.75×L3 distant from the bottom 1a-side end of the positive electrode-joined portion 90 and a position (second boundary 26) L3 distant from the bottom 1a-side end of the positive electrode-joined portion 90.

Sample 3

Figure 11:
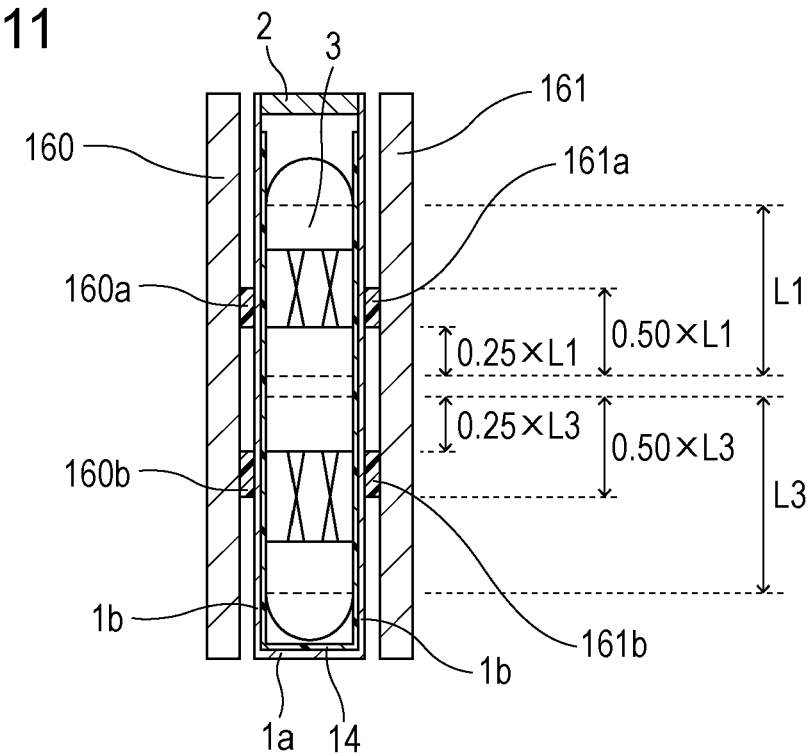
FIG. 11 is a view of the cross sections of a prismatic secondary battery and pressing jigs in Sample 3.

FIG. 11 is a view of the cross sections of the prismatic secondary battery 20, the first pressing jig 160, and the second pressing jig 161 in Sample 3, where the cross sections are parallel to the second side walls 1c. In Sample 3, the first pressing portion 160a and the third pressing portion 161a each press a region of the power generation part 3a of the flat wound electrode body 3, the region being located between a position 0.25×L1 distant from the sealing plate 2-side end of the positive electrode-joined portion 90 and a position 0.50×L1 distant from the sealing plate 2-side end of the positive electrode-joined portion 90. The second pressing portion 160*b* and the fourth pressing portion 161*b* each press a region of the power generation part 3*a* of the flat wound electrode body 3, the region being located between a position 0.25×L3 distant from the bottom 1*a*-side end of the positive electrode-joined portion 90 and a position 0.50×L3 distant from the bottom 1*a*-side end of the positive electrode-joined portion 90.

Sample 4

Figure 12:
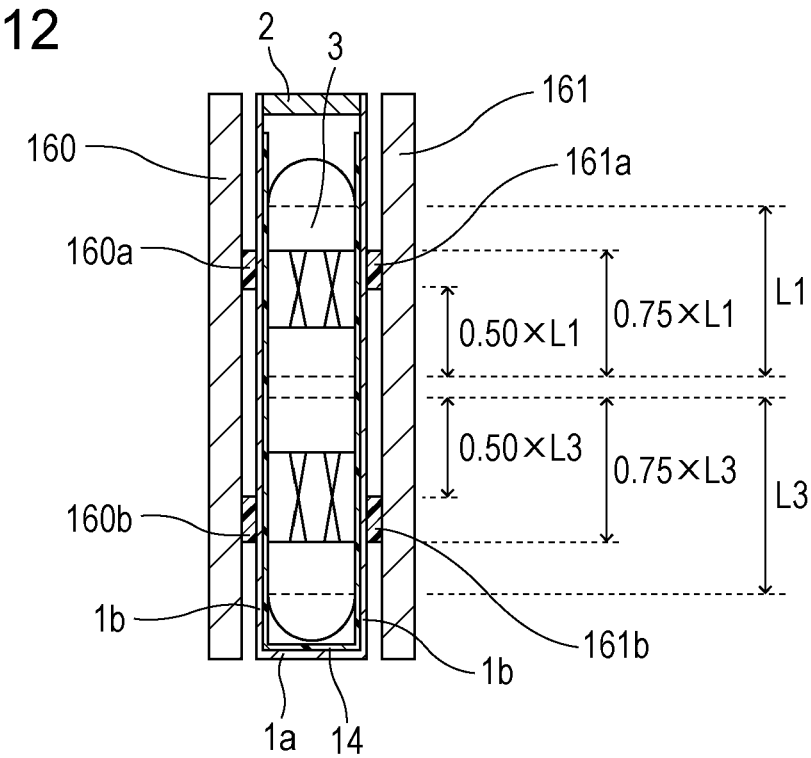
FIG. 12 is a view of the cross sections of a prismatic secondary battery and pressing jigs in Sample 4.

FIG. 12 is a view of the cross sections of the prismatic secondary battery 20, the first pressing jig 160, and the second pressing jig 161 in Sample 4, where the cross sections are parallel to the second side walls 1*c*. In Sample 4, the first pressing portion 160*a* and the third pressing portion 161*a* each press a region of the power generation part 3*a* of the flat wound electrode body 3, the region being located between a position 0.50×L1 distant from the sealing plate 2-side end of the positive electrode-joined portion 90 and a position 0.75×L1 distant from the sealing plate 2-side end of the positive electrode-joined portion 90. The second pressing portion 160*b* and the fourth pressing portion 161*b* each press a region of the power generation part 3*a* of the wound electrode body 3, the region being located between a position 0.50×L3 distant from the bottom 1*a*-side end of the positive electrode-joined portion 90 and a position 0.75×L3 distant from the bottom 1*a*-side end of the positive electrode-joined portion 90.

Initial Reaction Force

The initial reaction forces of Samples 1 to 4 measured by the above-described method are shown in Table 1. In Table 1, the initial reaction force of Sample 3 is taken as 100, and the initial reaction forces of other samples are expressed as relative values.

TABLE 1

| | Initial Reaction Force |
|---|---|
| Sample 1 | 63 |
| Sample 2 | 46 |
| Sample 3 | 100 |
| Sample 4 | 86 |

The initial reaction force is large for Sample 3 where the region between a position 0.25×L1 distant from the sealing plate 2-side end of the positive electrode-joined portion 90 and a position 0.50×L1 distant from the sealing plate 2-side end of the positive electrode-joined portion 90 is pressed, and the region between a position 0.25×L3 distant from the bottom 1*a*-side end of the positive electrode-joined portion 90 and a position 0.50×L3 distant from the bottom 1*a*-side end of the positive electrode-joined portion 90 is pressed. The initial reaction force is also relatively large for Sample 4 where the region between a position 0.50×L1 distant from the sealing plate 2-side end of the positive electrode-joined portion 90 and a position 0.75×L1 distant from the sealing plate 2-side end of the positive electrode-joined portion 90 is pressed, and the region between a position 0.50×L3 distant from the bottom 1*a*-side end of the positive electrode-joined portion 90 and a position 0.75×L3 distant from the bottom 1*a*-side end of the positive electrode-joined portion 90 is pressed.

The initial reaction force is low for Sample 1 and Sample 2 where the region between a position 0.25×L1 distant from the sealing plate 2-side end of the positive electrode-joined portion 90 and a position 0.75×L1 distant from the sealing plate 2-side end of the positive electrode-joined portion 90 is not pressed, and the region between a position 0.25×L3 distant from the bottom 1*a*-side end of the positive electrode-joined portion 90 and a position 0.75×L3 distant from the bottom 1*a*-side end of the positive electrode-joined portion 90 is not pressed.

The reason for increased initial reaction forces may be as described below. In the process for assembling the prismatic secondary battery 20, the non-aqueous electrolyte solution permeates the wound electrode body 3 to cause expansion of components of the wound electrode body 3. For example, the binder in the positive electrode active material mixture layer or the negative electrode active material mixture layer may swell due to the non-aqueous electrolyte solution. Since the prismatic secondary battery 20 has been charged, the wound electrode body 3 may expand due to, for example, formation of coating films on the active material mixture layers and expansion of the active material mixture layers.

The degree of such expansion of the wound electrode body 3 differs for each region in the wound electrode body 3. Thus, the initial reaction force also differs greatly depending on the position of the prismatic secondary battery 20 to be pressed, as described above. In the present invention, the reaction force can be reduced by preventing particular regions from being pressed. The particular regions are defined on the basis of the joined portions each between the current collector and the core-exposed portion.

In the flat wound electrode body 3, the positive electrode plate 40 and the negative electrode plate 50 in regions near the positive electrode-joined portion 90 and the negative electrode-joined portion 91 are strongly held by the positive electrode-joined portion 90 and the negative electrode-joined portion 91 in the layering direction, respectively. In regions near the positive electrode-joined portion 90 and the negative electrode-joined portion 91 in the flat wound electrode body 3, expansion is thus unlikely to occur. In the first curved portion 3*c* and the second curved portion 3*d*, the positive electrode plate 40 and the negative electrode plate 50 are layered in a curved state, and expansion is difficult to occur in these regions. As a result, distortion accumulates in regions near the positive electrode-joined portion 90 and the negative electrode-joined portion 91 and a region between the first curved portion 3*c* and the second curved portion 3*d* where expansion is unlikely to occur. Such accumulation of distortion may facilitate expansion of portions at predetermined distances from the positive electrode-joined portion 90 and the negative electrode-joined portion 91 in the direction perpendicular to the winding axis (the direction perpendicular to the bottom 1*a* of the prismatic outer body 1).

When viewed in the direction perpendicular to the first side wall 1*b*, a region of the first side wall 1*b*, the region overlapping the flat portion 3*b* and a region located between a position 0.25×L1 distant from the sealing plate 2-side end of the positive electrode-joined portion 90 and a position 0.50×L1 distant from the sealing plate 2-side end of the positive electrode-joined portion 90, is preferably substantially free of pressure from the spacer 60. For example, 95% or more of the region of the first side wall 1*b* is preferably free of pressure from the spacer 60. When viewed in the direction perpendicular to the first side wall 1*b*, a region of the first side wall 1*b*, the region overlapping the flat portion 3*b* and a region located between a position 0.25×L3 distant from the bottom 1*a*-side end of the positive electrode-joined portion 90 and a position 0.50×L3 distant from the bottom 1a-side end of the positive electrode-joined portion 90, is preferably substantially free of pressure from the spacer 60. For example, 95% or more of the region of the first side wall 1b is preferably free of pressure from the spacer 60.

Reaction Force after Charge/Discharge Cycle

The charge/discharge cycle test was carried out for Samples 5 and 6. The structures of Sample 5 and Sample 6 are as described below.

Sample 5

Sample 5 has the same structure as Samples 1 to 4 except for the configuration associated with the first pressing portion 160a and the second pressing portion 160b of the first pressing jig 160 and the configuration associated with the third pressing portion 161a and the fourth pressing portion 161b of the second pressing jig 161. In Sample 5, the first pressing jig 160 has two first pressing portions 160a and two second pressing portions 160b, and the second pressing jig 161 has two third pressing portions 161a and two fourth pressing portions 161b. The pair of first side walls 1b of the prismatic secondary battery 20 is pressed at the same positions as those for Sample 1 and Sample 2. Specifically, the following regions in the power generation part 3a of the flat wound electrode body 3 are pressed: a region between the sealing plate 2-side end of the positive electrode-joined portion 90 and a position 0.25×L1 distant from the sealing plate 2-side end of the positive electrode-joined portion 90; and a region between a position 0.75×L1 distant from the sealing plate 2-side end of the positive electrode-joined portion 90 and a position (first boundary 25) L1 distant from the sealing plate 2-side end of the positive electrode-joined portion 90. Moreover, the following regions in the power generation part 3a of the flat wound electrode body 3 are pressed: a region between the bottom 1a-side end of the positive electrode-joined portion 90 and a position 0.25×L3 distant from the bottom 1a-side end of the positive electrode-joined portion 90; and a region between a position 0.75×L3 distant from the bottom 1a-side end of the positive electrode-joined portion 90 and a position (second boundary 26) L3 distant from the bottom 1a-side end of the positive electrode-joined portion 90.

Sample 6

Sample 6 has the same structure as Samples 1 to 4 except for the configuration associated with the first pressing portion 160a and the second pressing portion 160b of the first pressing jig 160 and the configuration associated with the third pressing portion 161a and the fourth pressing portion 161b of the second pressing jig 161. In Sample 6, the first pressing portion 160a and the second pressing portion 160b of the first pressing jig 160 are wide, and the third pressing portion 161a and the fourth pressing portion 161b of the second pressing jig 161 are wide. The pair of first side walls 1b of the prismatic secondary battery 20 is pressed at the same positions as those for Sample 3 and Sample 4. Specifically, a region of the power generation part 3a of the flat wound electrode body 3, the region being located between a position 0.25×L1 distant from the sealing plate 2-side end of the positive electrode-joined portion 90 and a position 0.75×L1 distant from the sealing plate 2-side end of the positive electrode-joined portion 90, is pressed. Moreover, a region of the power generation part 3a of the flat wound electrode body 3, the region being located between a position 0.25×L3 distant from the bottom 1a-side end of the positive electrode-joined portion 90 and a position 0.75×L3 distant from the bottom 1a-side end of the positive electrode-joined portion 90, is pressed.

For Samples 5 and 6, the distance between the first pressing portion 160a of the first pressing jig 160 and the third pressing portion 161a of the second pressing jig 161 was fixed at 17.6 mm, and the following test was carried out under a condition of 55° C.

Charge/Discharge Cycle Test

The state of charge (SOC) of the prismatic secondary battery 20 was adjusted to 30%. Next, a cycle in which the battery was charged at 10 C by a capacity corresponding to 50% of the IC discharge capacity (the capacity when the battery is discharged at 1 C from 100% SOC to 0% SOC) and subsequently discharged at 10 C by the equivalent capacity was repeated until the throughput reached 100 kWh (integration of charge and discharge throughput).

The increment of the load applied to the load cell 172 after the charge/discharge cycle test was defined as the increment of the reaction force. The increment of the reaction force for Sample 5 and Sample 6 measured by the above-described method is shown in Table 2. In Table 2, the increment of the reaction force for Sample 5 is taken as 100, and the increment of the reaction force for Sample 6 is expressed as a relative value.

TABLE 2

| | Increment of Reaction Force |
|---|---|
| Sample 5 | 100 |
| Sample 6 | 108 |

The test results of Sample 6 indicate that the following regions in the power generation part 3a of the flat wound electrode body 3 expand to a large degree, and the reaction force increases greatly when these regions are pressed: the region extending toward the first boundary 25 from a position 0.25×L1 distant from the sealing plate 2-side end of the positive electrode-joined portion 90 to a position 0.75×L1 distant from the sealing plate 2-side end of the positive electrode-joined portion 90; and the region extending toward the second boundary 26 from a position 0.25×L3 distant from the bottom 1a-side end of the positive electrode-joined portion 90 to a position 0.75×L3 distant from the bottom 1a-side end of the positive electrode-joined portion 90.

It is found that an increase in reaction force due to charge/discharge cycling can be suppressed in Sample 5 where the following regions are not pressed: in the power generation part 3a of the flat wound electrode body 3, the region extending toward the first boundary 25 from a position 0.25×L1 distant from the sealing plate 2-side end of the positive electrode-joined portion 90 to a position 0.75×L1 distant from the sealing plate 2-side end of the positive electrode-joined portion 90; and the region extending toward the second boundary 26 from a position 0.25×L3 distant from the bottom 1a-side end of the positive electrode-joined portion 90 to a position 0.75×L3 distant from the bottom 1a-side end of the positive electrode-joined portion 90.

Modification 1

In the prismatic secondary battery 20 according to the embodiment described above, the sealing plate 2-side end of the positive electrode-joined portion 90 is located at the same position as the sealing plate 2-side end of the negative electrode-joined portion 91, and the bottom 1a-side end of the positive electrode-joined portion 90 is located at the same position as the bottom 1a-side end of the negative electrode-joined portion 91 in the direction perpendicular to the bottom 1a of the prismatic outer body 1. In a prismatic secondary battery according to Modification 1, the positive electrode-joined portion 90 is not located at the same position as the negative electrode-joined portion 91 in the direction perpendicular to the bottom 1a of the prismatic outer body 1. The prismatic secondary battery according to Modification 1 has the same structure as the prismatic secondary battery 20 according to the embodiment except for the positions of the positive electrode-joined portion 90 and the negative electrode-joined portion 91.

Figure 13:
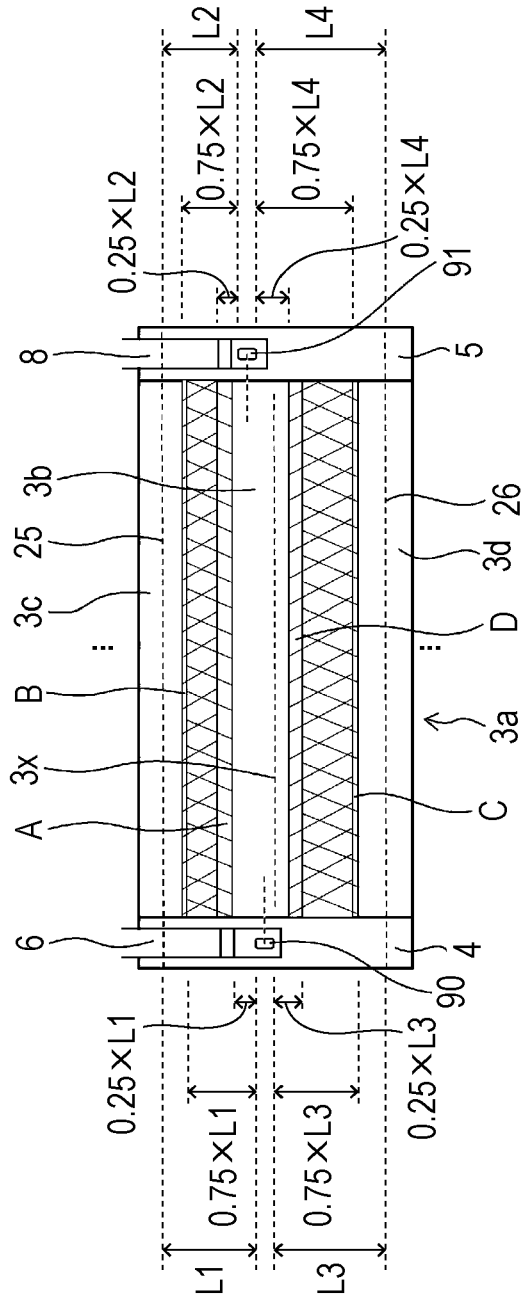
FIG. 13 is a plan view of a wound electrode body according to a modification.

FIG. 13 illustrates the surface of a flat wound electrode body 3 of a prismatic secondary battery according to Modification 1 in which a positive electrode current collector 6 and a negative electrode current collector 8 are connected to the surface.

In the direction perpendicular to a bottom 1a of a prismatic outer body 1, the distance between the first boundary 25 and a sealing plate 2-side end of a positive electrode-joined portion 90 is denoted by L1. In the direction perpendicular to the bottom 1a of the prismatic outer body 1, a region of a power generation part 3a, the region extending toward the first boundary 25 from a position 0.25×L1 to a position 0.75×L1 distant from the sealing plate 2-side end of the positive electrode-joined portion 90, is defined as a first region A.

In the direction perpendicular to the bottom 1a of the prismatic outer body 1, the distance between the first boundary 25 and a sealing plate 2-side end of the negative electrode-joined portion 91 is denoted by L2. In the direction perpendicular to the bottom 1a of the prismatic outer body 1, a region of the power generation part 3a, the region extending toward the first boundary 25 from a position 0.25×L2 to a position 0.75×L2 distant from a sealing plate 2-side end of the negative electrode-joined portion 91, is defined as a second region B.

In the flat wound electrode body 3, the first region A and the second region B expand easily. Therefore, when viewed in the direction perpendicular to one of a pair of first side walls 1b, the area of a region pressed by the spacer 60, the region being in a region that lies in the one of the pair of first side walls 1b and overlaps at least one of the first region A and the second region B, is preferably 20% or less, more preferably 10% or less, and still more preferably 5% or less of the area of the region that lies in the one of the pair of first side walls 1b and overlaps at least one of the first region A and the second region B.

In the direction perpendicular to the bottom 1a of the prismatic outer body 1, the distance between the second boundary 26 and a bottom 1a-side end of the positive electrode-joined portion 90 is denoted by L3. In the direction perpendicular to the bottom 1a of the prismatic outer body 1, a region of the power generation part 3a, the region extending toward the second boundary 26 from a position 0.25×L3 to a position 0.75×L3 distant from the bottom 1a-side end of the positive electrode-joined portion 90, is defined as a third region C.

In the direction perpendicular to the bottom 1a of the prismatic outer body 1, the distance between the second boundary 26 and a bottom 1a-side end of the negative electrode-joined portion 91 is denoted by L4. In the direction perpendicular to the bottom 1a of the prismatic outer body 1, a region of the power generation part 3a, the region extending toward the second boundary 26 from a position 0.25×L4 to a position 0.75×L4 distant from the bottom 1a-side end of the negative electrode-joined portion 91, is defined as a fourth region D.

The third region C and the fourth region D in the flat wound electrode body 3 expand easily. Therefore, when viewed in the direction perpendicular to one of a pair of first side walls 1b, the area of a region pressed by the spacer 60, the region being in a region that lies in the one of the pair of first side walls 1b and overlaps at least one of the third region C and the fourth region D, is preferably 20% or less, more preferably 10% or less, and still more preferably 5% or less of the area of the region that lies in the one of the pair of first side walls 1b and overlaps at least one of the third region C and the fourth region D.

When viewed in the direction perpendicular to one of a pair of first side walls 1b, the area of a region pressed by the spacer 60, the region being in a region that lies in the one of the pair of first side walls 1b and overlaps the flat portion 3b of the power generation part 3a but does not overlap the first region A, the second region B, the third region C, or the fourth region D, is preferably 70% or more, and more preferably 80% or more of the area of the region that lies in the one of the pair of first side walls 1b and overlaps the flat portion 3b of the power generation part 3a but does not overlap the first region A, the second region B, the third region C, or the fourth region D.

Modification 2

Figure 14:
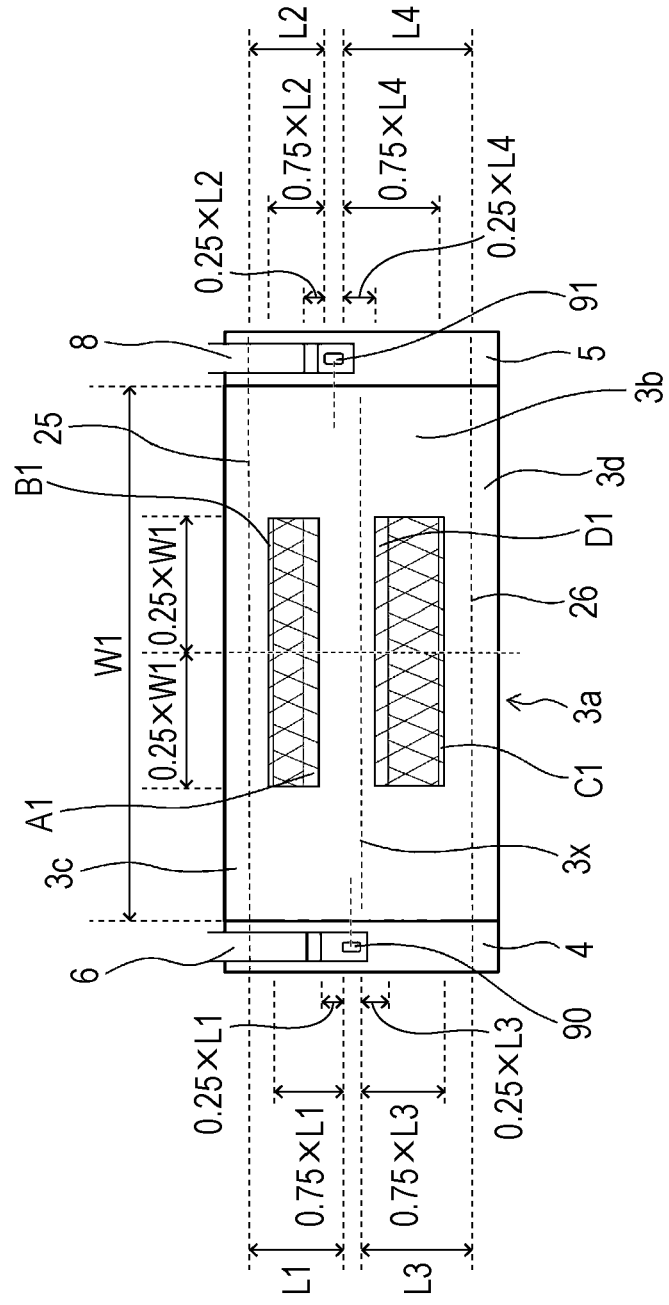
FIG. 14 is a plan view of a wound electrode body according to a modification.

FIG. 14 illustrates the surface of a flat wound electrode body 3 of a prismatic secondary battery according to Modification 2 in which a positive electrode current collector 6 and a negative electrode current collector 8 are connected to the surface. The prismatic secondary battery according to Modification 2 has the same structure as the prismatic secondary battery according to Modification 1.

As illustrated in FIG. 14, the width of a flat portion 3b of a power generation part 3a of the flat wound electrode body 3 in the direction in which the winding axis of the flat wound electrode body 3 extends (horizontal direction in FIG. 14) is denoted by W1. In the direction in which the winding axis extends, a region between a position 0.25×W1 distant from the center line of the flat portion 3b to one side and a position 0.25×W1 distant from the center line of the power generation part 3a to the other side is defined as a fifth region. When viewed in the direction perpendicular to one first side wall 1b, the area of a region pressed by the spacer 60, the region being in a region that lies in one first side wall 1b and overlaps the fifth region and at least one of the first region A and the second region B, that is, in a region that lies in one first side wall 1b and overlaps at least one of A1 and B1 in FIG. 14, is preferably 5% or less of the area of the region that lies in one first side wall 1b and overlaps the fifth region and at least one of the first region A and the second region B.

When viewed in the direction perpendicular to one first side wall 1b, the area of a region pressed by the spacer 60, the region being in a region that lies in one first side wall 1b and overlaps the fifth region and at least one of the third region C and the fourth region D, that is, in a region that lies in one first side wall 1b and overlaps at least one of C1 and D1 in FIG. 14, is preferably 5% or less of the area of the region that lies in one first side wall 1b and overlaps the fifth region and at least one of the first region A and the second region B.

Moreover, when viewed in the direction perpendicular to the other first side wall 1b, the area of a region pressed by each spacer, the region being in a region that lies in the other first side wall 1b and overlaps the fifth region and at least one of the first region A and the second region B, that is, in a region that overlaps at least one of A1 and B1 in FIG. 14, is preferably 5% or less of the area of the region that lies in the other first side wall 1b and overlaps the fifth region and at least one of the first region A and the second region B.

Moreover, when viewed in the direction perpendicular to the other first side wall 1b, the area of a region pressed by each spacer, the region being in a region that lies in the other first side wall 1b and overlaps the fifth region and at least one of the third region C and the fourth region D, that is, in a region that overlaps at least one of C1 and D1 in FIG. 14, is preferably 5% or less of the area of the region that lies in the other first side wall 1b and overlaps the fifth region and at least one of the third region C and the fourth region D.

When viewed in the direction perpendicular to one first side wall 1b, the area of a region pressed by each spacer, the region being in a region that lies in one first side wall 1b and overlaps the flat portion 3b but does not overlap the region A1, the region B1, the region C1, or the region D1, is preferably 70% or more of the area of the region that lies in one first side wall 1b and overlaps the flat portion 3b but does not overlap the region A1, the region B1, the region C1, or the region D1.

When viewed in the direction perpendicular to the other first side wall 1b, the area of a region pressed by each spacer, the region being in a region that lies in the other first side wall 1b and overlaps the flat portion 3b but does not overlap the region A1, the region B1, the region C1, or the region D1, is preferably 70% or more of the area of the region that lies in the other first side wall 1b and overlaps the flat portion 3b but does not overlap the region A1, the region B1, the region C1, or the region D1.

Figure 15:
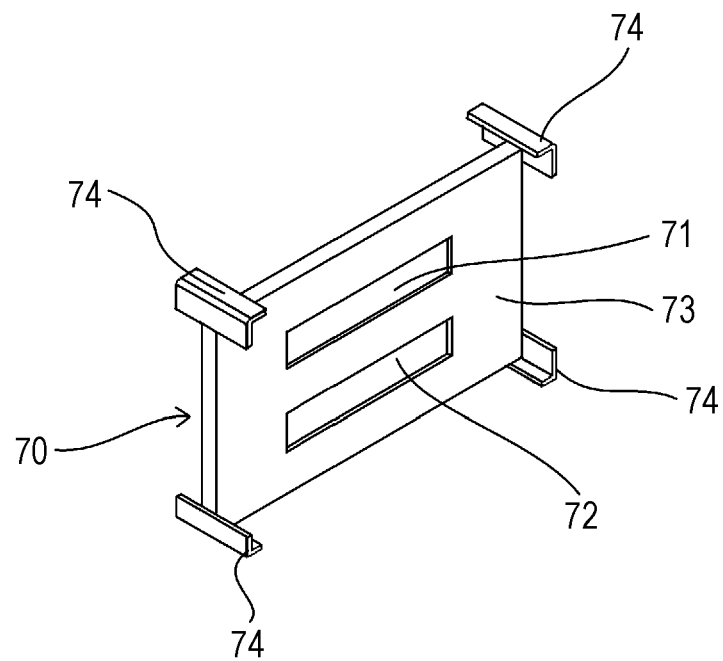
FIG. 15 is a perspective view of a spacer according to a modification.

In Modification 2, a spacer 70 as illustrated in FIG. 15 can be used. The spacer 70 has an upper recess 71 and a lower recess 72 on each surface.

When viewed in the direction perpendicular to one first side wall 1b, a region that lies in one first side wall 1b and overlaps the fifth region and at least one of the first region A and the second region B, that is, a region that lies in one first side wall 1b and overlaps at least one of A1 and B1 in FIG. 14 is located to oppose the upper recess 71. When viewed in the direction perpendicular to one first side wall 1b, a region that lies in one first side wall 1b and overlaps the fifth region and at least one of the third region C and the fourth region D, that is, a region that lies in one first side wall 1b and overlaps at least one of C1 and D1 in FIG. 14 is located to oppose the lower recess 72.

The spacer 70 has a pressing portion 73, and the pressing portion 73 presses the first side wall of the prismatic outer body 1. The spacer 70 preferably has wall portions 74 at four respective corners to prevent displacement of prismatic secondary batteries. The spacer 70 has the upper recess 71, the lower recess 72, and the pressing portion 73 on each surface.

Others

The positive electrode plate, the negative electrode plate, the non-aqueous electrolyte, the separator, and other components can be made of known materials used for lithium-ion secondary batteries.

Examples of suitable positive electrode active materials include lithium-transition metal composite oxides. Examples of lithium-transition metal composite oxides include lithium cobalt oxide, lithium manganese oxide, lithium nickel oxide, lithium-nickel-manganese composite oxide, lithium-nickel-cobalt composite oxide, and lithium-nickel-cobalt-manganese composite oxide. The lithium-transition metal composite oxides further containing, for example, Al, Ti, Zr, W, Nb, B, Mg, or Mo may be used.

The negative electrode active material is preferably a carbon material that can intercalate and deintercalate lithium ions. Examples of the carbon material that can intercalate and deintercalate lithium ions include graphite, non-graphitizable carbon, graphitizable carbon, fibrous carbon, coke, and carbon black. Among these, graphite is particularly preferred. Examples of non-carbon materials include silicon, tin, and alloys and oxides mainly composed of silicon or tin.

Examples of non-aqueous solvents (organic solvents) for the non-aqueous electrolyte include carbonates, lactones, ethers, ketones, and esters. These solvents may be used as a mixture of two or more. Examples of carbonates include cyclic carbonates, such as ethylene carbonate, propylene carbonate, and butylene carbonate; and linear carbonates, such as dimethyl carbonate, ethyl methyl carbonate, and diethyl carbonate. In particular, a solvent mixture containing a cyclic carbonate and a linear carbonate is preferably used. An unsaturated cyclic carbonate, such as vinylene carbonate (VC), can also be added to the non-aqueous electrolyte.

Examples of electrolyte salts for the non-aqueous electrolyte include electrolyte salts that have commonly been used in lithium-ion secondary batteries known in the art. Examples of electrolyte salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, $LiB(C_2O_4)_2$, $LiB(C_2O_4)F_2$, $LiP(C_2O_4)_3$, $LiP(C_2O_4)_2F_2$, $LiP(C_2O_4)F_4$, and mixtures thereof. Among these, $LiPF_6$ is particularly preferred. The amount of the electrolyte salt dissolved in the non-aqueous solvent is preferably 0.5 to 2.0 mol/L.

The separator is preferably formed of a resin porous membrane. For example, a polyolefin porous membrane is preferably used. The polyolefin is particularly preferably polypropylene (PP), polyethylene (PE), or the like. In addition, a separator having a three-layer structure composed of polypropylene (PP) and polyethylene (PE) (PP/PE/PP or PE/PP/PE) can also be used. A polymer electrolyte may be used as a separator.

The packing density of the positive electrode active material mixture layer is preferably 1.5 g/cm$^3$ to 4.0 g/cm$^3$, and more preferably 2.0 g/cm$^3$ to 3.0 g/cm$^3$. The packing density of the negative electrode active material mixture layer is preferably 0.5 g/cm$^3$ to 2.5 g/cm$^3$, and more preferably 0.8 g/cm$^3$ to 1.8 g/cm$^3$.

The length of the flat wound electrode body in the direction in which the winding axis of the flat wound electrode body extends is preferably 50 mm to 200 mm, and more preferably 90 mm to 160 mm. The length of the flat wound electrode body in the direction perpendicular to the winding axis of the flat wound electrode body (the direction perpendicular to the bottom of the prismatic outer body) is preferably 50 mm to 100 mm, and more preferably 50 mm to 80 mm. The thickness of the flat wound electrode body is preferably 5 mm to 30 mm, and more preferably from 8 mm to 20 mm.

In the flat wound electrode body, the winding number of the positive electrode plate is preferably 20 to 120, and more preferably 30 to 100.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A battery pack comprising a plurality of prismatic secondary batteries with spacers each interposed therebetween, wherein the prismatic secondary batteries each have
a flat wound electrode body that is formed by winding a positive electrode plate having a positive electrode active material mixture layer and a negative electrode plate having a negative electrode active material mixture layer with a separator interposed therebetween,
a prismatic outer body that has an opening, a bottom, a pair of first side walls, and a pair of second side walls and houses the wound electrode body, and
a sealing plate that seals the opening,
the first side walls are larger in area than the second side walls,
the wound electrode body has a wound positive electrode core-exposed portion on a side of one of the pair of second side walls and a wound negative electrode core-exposed portion on a side of the other of the pair of second side walls,
a positive electrode current collector is joined to the positive electrode core-exposed portion to form a positive electrode-joined portion,
a negative electrode current collector is joined to the negative electrode core-exposed portion to form a negative electrode-joined portion,
the wound electrode body has a power generation part in which the positive electrode active material mixture layer and the negative electrode active material mixture layer are layered with the separator interposed therebetween,
the power generation part has a flat portion having a flat outer surface, a first curved portion having a curved outer surface and located nearer to the sealing plate than the flat portion, and a second curved portion having a curved outer surface and located nearer to the bottom than the flat portion,
a boundary between the flat portion and the first curved portion is defined as a first boundary, and a boundary between the flat portion and the second curved portion is defined as a second boundary,
in a direction perpendicular to the bottom, a distance between the first boundary and a sealing plate-side end of the positive electrode-joined portion is denoted by L1 and, in the direction perpendicular to the bottom, a region of the power generation part, the region extending toward the first boundary from a position 0.25×L1 to a position 0.75×L1 distant from the sealing plate-side end of the positive electrode-joined portion, is defined as a first region,
in the direction perpendicular to the bottom, a distance between the first boundary and a sealing plate-side end of the negative electrode-joined portion is denoted by L2 and, in the direction perpendicular to the bottom, a region of the power generation part, the region extending toward the first boundary from a position 0.25×L2 to a position 0.75×L2 distant from the sealing plate-side end of the negative electrode-joined portion, is defined as a second region,
in the direction perpendicular to the bottom, a distance between the second boundary and a bottom-side end of the positive electrode-joined portion is denoted by L3 and, in the direction perpendicular to the bottom, a region of the power generation part, the region extending toward the second boundary from a position 0.25×L3 to a position 0.75×L3 distant from the bottom-side end of the positive electrode-joined portion, is defined as a third region,
in the direction perpendicular to the bottom, a distance between the second boundary and a bottom-side end of the negative electrode-joined portion is denoted by L4 and, in the direction perpendicular to the bottom, a region of the power generation part, the region extending toward the second boundary from a position 0.25×L4 to a position 0.75×L4 distant from the bottom-side end of the negative electrode-joined portion, is defined as a forth region,
when viewed in a direction perpendicular to one of the pair of first side walls, the area of a region pressed by each spacer, the region being in a region that lies in the one of the pair of first side walls and overlaps at least one of the first region and the second region, is 20% or less of the area of the region that lies in the one of the pair of first side walls and overlaps at least one of the first region and the second region, and
when viewed in the direction perpendicular to one of the pair of first side walls, the area of a region pressed by each spacer, the region being in a region that lies in the one of the pair of first side walls and overlaps at least one of the third region and the fourth region, is 20% or less of the area of the region that lies in the one of the pair of first side walls and overlaps at least one of the third region and the fourth region.

2. The battery pack according to claim 1, wherein,
when viewed in a direction perpendicular to the other of the pair of first side walls, the area of a region pressed by each spacer, the region being in a region that lies in the other of the pair of first side walls and overlaps at least one of the first region and the second region, is preferably 20% or less of the area of the region that lies in the other of the pair of first side walls and overlaps at least one of the first region and the second region, and
when viewed in the direction perpendicular to the other of the pair of first side walls, the area of a region pressed by each spacer, the region being in a region that lies in the other of the pair of first side walls and overlaps at least one of the third region and the fourth region, is 20% or less of the area of the region that lies in the other of the pair of first side walls and overlaps at least one of the third region and the fourth region.

3. The battery pack according to claim 1, wherein,
when viewed in the direction perpendicular to one of the pair of first side walls, a region of the one of the pair of first side walls, the region overlapping the flat portion and a region located between the first region and the third region, is pressed by each spacer, and
when viewed in the direction perpendicular to the other of the pair of first side walls, a region of the other of the pair of first side walls, the region overlapping the flat portion and a region located between the first region and the third region, is pressed by each spacer.

4. The battery pack according to claim 1, wherein,
when viewed in the direction perpendicular to one of the pair of first side walls, the area of a region pressed by each spacer, the region being in a region that lies in the one of the pair of first side walls and overlaps the flat portion but does not overlap the first region, the second region, the third region, or the fourth region, is 70% or more of the area of the region that lies in the one of the pair of first side walls and overlaps the flat portion but does not overlap the first region, the second region, the third region, or the fourth region.

5. The battery pack according to claim 4, wherein,
when viewed in the direction perpendicular to the other of the pair of first side walls, the area of a region pressed by each spacer, the region being in a region that lies in the other of the pair of first side walls and overlaps the flat portion but does not overlap the first region, the second region, the third region, or the fourth region, is 70% or more of the area of the region that lies in the other of the pair of first side walls and overlaps the flat portion but does not overlap the first region, the second region, the third region, or the fourth region.

6. The battery pack according to claim 1, wherein,
when viewed in the direction perpendicular to one of the pair of first side walls, a first recess is provided in a portion of each spacer, the portion opposing a region that lies in the one of the pair of first side walls and overlaps at least one of the first region and the second region, and when viewed in the direction perpendicular to one of the pair of first side walls, a second recess is provided in a portion of each spacer, the portion opposing a region that lies in the one of the pair of first side walls and overlaps at least one of the third region and the fourth region.

* * * * *